US010549253B2

(12) United States Patent
Moonen et al.

(10) Patent No.: US 10,549,253 B2
(45) Date of Patent: *Feb. 4, 2020

(54) REACTOR SYSTEM FOR HIGH THROUGHPUT APPLICATIONS

(71) Applicant: Avantium Technologies B.V., Amsterdam (NL)

(72) Inventors: Roelandus Hendrikus Wilhelmus Moonen, Amsterdam (NL); Benno Hartog, Amsterdam (NL)

(73) Assignee: Avantium Technologies B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,552

(22) Filed: Sep. 17, 2018

(65) Prior Publication Data
US 2019/0022619 A1    Jan. 24, 2019

Related U.S. Application Data

(63) Continuation of application No. 15/036,831, filed as application No. PCT/NL2014/050793 on Nov. 20, 2014, now Pat. No. 10,099,197.

(30) Foreign Application Priority Data

Nov. 28, 2013   (NL) ..................................... 2011856

(51) Int. Cl.
*B01J 19/00*   (2006.01)
(52) U.S. Cl.
CPC ....... *B01J 19/0093* (2013.01); *B01J 19/0046* (2013.01); *B01J 2219/0086* (2013.01);
(Continued)

(58) Field of Classification Search
CPC ................ B01J 19/0093; B01J 19/0046; B01J 2219/00896; B01J 2219/00808;
(Continued)

(56) References Cited

U.S. PATENT DOCUMENTS 6,548,895 B1   4/2003   Benavides et al.
6,749,814 B1   6/2004   Bergh et al.
(Continued)

FOREIGN PATENT DOCUMENTS

EP   1297889 A2   4/2003
WO   99/64160 A1   12/1999

OTHER PUBLICATIONS

Eker, B., et al., "A Microfluidic Architecture for Efficient Reagent Integration, Reagent Release, and Analyte Detection in Limited Sample Volume", Proc. 17th International Conference on Miniaturized Systems for Chemistry and Life Sciences, Oct. 27-31, 2013, pp. 1150-1152.
(Continued)

*Primary Examiner* — Huy Tram Nguyen
(74) *Attorney, Agent, or Firm* — Hoffmann & Baron, LLP

(57) ABSTRACT

A reactor system for high throughput applications includes a plurality of reactor assemblies, each reactor assembly including: a fluid source, which fluid source is adapted to provide a pressurized fluid to the flow-through reactors, a flow splitter which flow splitter includes a planar microfluidic chip, which microfluidic chip has a chip inlet channel and a plurality of chip outlet channels, which microfluidic chip further includes a plurality of flow restrictor channels, where each flow restrictor channel extends from said chip inlet channel to an associated chip outlet channel, where the chip inlet channel and the chip outlet channels each have a diameter, where the diameter of the chip inlet channel is the same or less than the length of said chip inlet channel and
(Continued)

where the diameter of each chip outlet channel is the same or less than the length of said chip outlet channel.

13 Claims, 10 Drawing Sheets

(52) U.S. Cl.
CPC .............. *B01J 2219/00286* (2013.01); *B01J 2219/00418* (2013.01); *B01J 2219/00808* (2013.01); *B01J 2219/00813* (2013.01); *B01J 2219/00817* (2013.01); *B01J 2219/00869* (2013.01); *B01J 2219/00896* (2013.01); *B01J 2219/00898* (2013.01); *B01J 2219/00959* (2013.01); *B01J 2219/00963* (2013.01); *B01J 2219/00984* (2013.01)

(58) Field of Classification Search
CPC .... B01J 2219/00813; B01J 2219/00817; B01J 2219/0086; B01J 2219/00869; B01J 2219/00898; B01J 2219/00959; B01J 2219/00963; B01J 2219/00984; B01J 2219/00286; B01J 2219/00418

USPC ........................................................ 422/603
See application file for complete search history.

(56) References Cited

U.S. PATENT DOCUMENTS

| | | | |
|---|---|---|---|
| 7,122,156 B2 * | 10/2006 | Bergh | ........................ B01J 4/00 422/606 |
| 2006/0006065 A1 | 1/2006 | Pinkas et al. | |
| 2007/0120903 A1 | 5/2007 | Takagi | |
| 2010/0144539 A1 | 6/2010 | Bergh et al. | |

OTHER PUBLICATIONS

International Search Report for corresponding International Application No. PCT/NL2014/050793, dated Jan. 19, 2015, 4 pages.
International Preliminary Report on Patentability for corresponding International Application No. PCT/NL2014/050793, dated Nov. 2, 2015, 17 pages.

* cited by examiner

REACTOR SYSTEM FOR HIGH THROUGHPUT APPLICATIONS

CROSS-REFERENCE TO RELATED APPLICATIONS

This application is a Continuation of U.S. application Ser. No. 15/036,831, filed May 16, 2016, which is the National Stage of International Application No. PCT/NL2014/050793 filed Nov. 20, 2013, which claims the benefit of Netherlands Application No. NL 2011856, filed Nov. 28, 2013, the contents of all of which are incorporated by reference herein.

FIELD OF THE INVENTION

The invention pertains to a reactor system for high throughput applications, such as performing parallel chemical experiments or synthesis of chemical substances in multiple parallel microreactors.

BACKGROUND OF THE INVENTION

Reactor systems comprising multiple parallel reactors which are operated in parallel or sequentially are widely known. In such systems, the equal distribution of fluid to the reactors is important. In the past, solutions have been proposed involving the arrangement of flow restrictors such as capillaries in the reactor feed lines that bring the fluid from a common fluid source to the reactors. The fluid will be evenly distributed over the reactors if the capillaries all have substantially the same resistance to fluid flow and have the highest resistance to fluid flow in the system. This is for example described in WO99/64160.

In recent years, it has been proposed to use microfluidic chips as flow restrictors instead of capillaries. Microfluidic chips are easier to handle than capillaries and require less space when long flow restrictor channels are required. Microfluidic chips are also used in flow splitters, in which typically microfluidic chips are applied that have a single common inlet port and multiple outlet ports, with flow restrictor channels extending between the common inlet port and one of the outlet ports.

The microfluidic chips that are used in reactor systems of the type to which the invention pertains are different from the microfluidic chips that are used for "lab-on-chip"-purposes in that in microfluidic chips for "lab-on-chip"-purposes usually one or more of the channel in the chip are adapted to function as a reactor. In the microfluidic chips that are in reactor systems of the type to which the invention pertains the channels in the microfluidic chip merely function as conduits for the fluid flow and not as reactors; the system comprises one or more separate reactors in which the reaction takes place.

Microfluidic chips have some problems when they are applied in elevated pressure reactor systems, for example systems in which the pressure inside the microfluidic chip exceeds 30 bar. Many high throughput applications require operation pressures above 30 bar, sometimes even above 100 bar, up to for example 300 bar.

Microfluidic chips usually have a planar shape and are generally made from two or more layers of glass, silicon or quartz that are bonded together after a flow channel is etched in one or more of the layers. These materials allow to accurately make channels in them. When a high pressure fluid flow is present in the channel, the layers in the microfluidic chip may become delaminated. Also, there is a risk of cracks forming in the silicon, glass or quartz. These kinds of failures may result in leakage of the microfluidic chip, and even breaking of the microfluidic chip is possible. Unlike for example a metal microfluidic chip, glass, silicon or quartz microfluidic chips are brittle and may break without warning due to microscopic cracks that are not visible by the naked eye. Such cracks may have formed during previous load pressure cycles on the microfluidic chip. For example, when a microfluidic chip first is tested at for example 150 bar, the microfluidic chip may look fine after that test, but it may break when later just 100 bar is applied due to the microscopic cracks that were formed during the test at 150 bar.

Another problem associated with the use of microfluidic chips at elevated pressures is that the connections between the microfluidic chip and the flow lines that feed the channel in the microfluidic chip or receive fluid from the channel in the microfluidic chip are hard to make fluid tight. In order to prevent leakage of these connections, these connections are often glued, but this makes it harder to exchange the microfluidic chip in the system for another microfluidic chip. It can be desired to exchange the microfluidic chip in the system for another microfluidic chip for example if a different resistance to fluid flow is desired, if a channel in the microfluidic chip has become clogged up or if the microfluidic chip leaks or has otherwise failed.

US2010/0144539 discloses a system with parallel reactors that comprises a microfluidic chips that is used as a flow splitter. In order to be able to operate this system at elevated pressures, a housing is provided in this known system. The pressure sensitive components of the system, such as the reactor vessels, valves, couplings, fittings and the flow splitter are arranged in this housing. The housing is pressurized to a high pressure by means of an auxiliary gas, for example nitrogen gas ($N_2$), which makes that the pressure sensitive components are subjected to just a small pressure differential.

This known system is rather complex, it poses a safety risk due to the rather large volume inside the housing that is brought to a high pressure and it is hard to detect the location of any leaks in the components and connections that are arranged inside the housing. Furthermore, an experiment cannot start before the housing is fully pressurized, which will take a while. This increases the time that is involved in conducting experiments.

SUMMARY OF THE INVENTION

The object of the invention is at least reduce one or more of the problems mentioned above.

This object is achieved with the reactor system according to one aspect of the present invention and with the reactor system according to an other aspect of the present invention; where the one aspect of the present invention includes:

Reactor system for high throughput applications, which reactor system comprises:
 a plurality of reactor assemblies, each reactor assembly comprising:
  a flow-through reactor, said flow-through reactor comprising a reactor inlet and a reactor outlet, which flow-through reactor is adapted to accommodate a chemical reaction,
  a reactor feed line, which reactor feed line has a first end and a second end, said second end being connected to the reactor inlet of the flow-through reactor, said reactor feed line being adapted to supply a fluid to the flow-through reactor,
a reactor effluent line, which reactor effluent line has a first end, which first end is connected to the reactor outlet of the flow-through reactor,
said reactor effluent line being adapted to discharge reactor effluent from the flow-through reactor,
a fluid source, which fluid source is adapted to provide a pressurized fluid to the flow-through reactors,
a flow splitter which is adapted to transfer said pressurized fluid from the fluid source to the reactor assemblies, so that said pressurized fluid can be used in the reactions inside the flow-through reactors,
which flow splitter is arranged downstream of the fluid source and upstream of the reactor assemblies,
which flow splitter comprises a planar microfluidic chip,
which microfluidic chip has a chip inlet channel and a plurality of chip outlet channels, wherein the chip inlet channel and the chip outlet channels each have a length,
which microfluidic chip further comprises a plurality of flow restrictor channels, wherein each flow restrictor channel extends from said chip inlet channel to an associated chip outlet channel,
wherein the chip inlet channel is in fluid communication with the fluid source and is adapted to receive the pressurized fluid from the fluid source,
and wherein each chip outlet channel is in fluid communication with the first end of a reactor feed line of an associated reactor assembly and adapted to provide pressurized fluid from the fluid source to the associated reactor assembly, thereby making said pressurized fluid available for the reaction in the flow-through reactor,
wherein the chip inlet channel and the chip outlet channels each have a diameter, wherein the diameter of the chip inlet channel is the same or less than the length of said chip inlet channel and wherein the diameter of each chip outlet channel is the same or less than the length of said chip outlet channel,
wherein the microfluidic chip comprises a first body plate and a second body plate which are connected to each other, wherein said first body plate and said second body plate each have a thickness,
wherein the chip inlet channel is present in the first body plate and extends through the thickness of said first body plate, and
wherein the chip outlet channels are present in the first body plate and/or the second body plate and extend through the thickness of said first body plate and/or said second body plate; and where the other aspect of the present invention includes:

Reactor system for high throughput applications, which reactor system comprises:
a plurality of reactor assemblies, each reactor assembly comprising:
a flow-through reactor, said flow-through reactor comprising a reactor inlet and a reactor outlet, which flow-through reactor is adapted to accommodate a chemical reaction,
a reactor feed line, which reactor feed line has a first end and a second end, said second end being connected to the reactor inlet of the flow-through reactor,
said reactor feed line being adapted to supply a fluid to the flow-through reactor,
a reactor effluent line, which reactor effluent line has a first end, which first end is connected to the reactor outlet of the flow-through reactor,
said reactor effluent line being adapted to discharge reactor effluent from the flow-through reactor,
a fluid source, which fluid source is adapted to provide a pressurized fluid to the flow-through reactors,
a flow path controller which is adapted to transfer said pressurized fluid from the fluid source to the reactor assemblies, so that said pressurized fluid can be used in the reactions inside the flow-through reactors,
which flow path controller is arranged downstream of the fluid source and upstream of the reactor assemblies,
which flow path controller comprises a flow path controller inlet which is in fluid communication with the fluid source and is adapted to receive the pressurized fluid from the fluid source,
which flow path controller further comprises a plurality of flow path controller outlets, each flow path controller outlet being in fluid communication with the first end of a reactor feed line of an associated reactor assembly and adapted to provide pressurized fluid from the fluid source to the associated reactor assembly,
wherein in a reactor feed line and/or reactor effluent line of at least one reactor assembly a flow restrictor channel is present, which flow restrictor channel is arranged in a planar microfluidic chip, which microfluidic chip further comprises a chip inlet channel and a chip outlet channel that are in fluid communication with the flow restrictor channel, the chip inlet channel being upstream of the flow restrictor channel and the chip outlet channel being downstream of the flow restrictor channel, both said chip inlet channel and said chip outlet channel having a length and a diameter, wherein the diameter of the chip inlet channel is the same or less than the length of said chip inlet channel and wherein the diameter of the chip outlet channel is the same or less than the length of said chip outlet channel,
wherein the microfluidic chip comprises a first body plate and a second body plate which are connected to each other, wherein said first body plate and said second body plate each have a thickness,
wherein the chip inlet channel is present in the first body plate and extends through the thickness of said first body plate, and
wherein the chip outlet channels are present in the first body plate and/or the second body plate and extend through the thickness of said first body plate and/or said second body plate.

The reactor system according to the invention comprises a plurality of reactor assemblies. Each reactor assembly comprises a flow-through reactor, which flow-through reactor comprises a reactor inlet and a reactor outlet.

Each reactor assembly further comprises a reactor feed line, which reactor feed line has a first end and a second end. The second end is connected to the reactor inlet of the flow-through reactor of the same reactor assembly. The reactor feed line is adapted to supply a fluid to that flow-through reactor.

Each reactor assembly further comprises a reactor effluent line, which reactor effluent line has a first end. The first end of the reactor effluent line is connected to the reactor outlet of the flow-through reactor of the same reactor assembly. The reactor effluent line is adapted to discharge reactor effluent from that flow-through reactor.

The reactor system according to the invention further comprises a fluid source, which fluid source is adapted to provide a pressurized fluid to the flow-through reactors of the reactor system. The fluid source may supply the pressurized fluid the all of the reactors in the reactor system, either simultaneously or sequentially, or just to some of the reactors in the reactor system. The pressurized fluid is for example a reaction fluid, a purge fluid, a dilution fluid. The pressurized fluid may be a gas, a liquid or a combination of a gas and a liquid.

Optionally, the reactor system according to the invention comprises multiple fluid sources. Optionally, these multiple fluid sources supply fluid to different groups of reactor assemblies. Optionally, at least one reactor assembly receives at least two different fluids.

In one form of the invention, the reactor system comprises a flow splitter which is adapted to transfer said pressurized fluid from the fluid source to the reactor assemblies so that said pressurized fluid can be used in the reactions inside the flow-through reactors. The flow splitter is arranged downstream of the fluid source and upstream of the reactor assemblies.

The flow splitter comprises a planar microfluidic chip, which microfluidic chip has a chip inlet channel and a plurality of chip outlet channels. The chip inlet channel and the chip outlet channels each have a length. The length of the chip inlet channel and the lengths of the chip outlet channels can be the same or different from each other.

The microfluidic chip further comprises a plurality of flow restrictor channels. Each flow restrictor channel extends from said chip inlet channel to an associated chip outlet channel. The flow restrictor channel generally extends at an angle—often perpendicular—to the axial direction of the chip inlet channel and the chip outlet channels.

The chip inlet channel is in fluid communication with the fluid source and is adapted to receive the pressurized fluid from the fluid source. Each chip outlet channel is in fluid communication with the first end of a reactor feed line of an associated reactor assembly and adapted to provide pressurized fluid from the fluid source to the associated reactor assembly, thereby making said pressurized fluid available for the reaction in the flow-through reactor.

Generally, the "associated reactor assembly" is a different reactor assembly for each chip outlet channel. Generally, each flow restrictor channel is in fluid communication with a different chip outlet channel, and in turn each chip outlet channel is in fluid communication with a different reactor assembly.

According to the invention, the chip inlet channel and the chip outlet channels each have a diameter, which diameter is the same or less than the length of said channel. So, each of these channels—either a chip inlet channel or a chip outlet channel—has a diameter, and that diameter is the same or less than the length of that same channel.

The diameters of the chip inlet channel and the chip outlet channels can be the same or different.

The diameter of the chip inlet channel being the same of smaller than the length of the chip inlet channel results in a chip inlet channel that is rather narrow. It was observed that when such a narrow chip inlet channel is present, far less cracking and delamination of the microfluidic chip occur when pressurized fluids flow through the microfluidic chip, in particular in the region of the chip inlet channel. This allows to use the microfluidic chip for high pressure applications.

Likewise, the diameter of each chip outlet channel being the same of smaller than the length of the same chip outlet channel results in chip outlet channels that are rather narrow. It was observed that when such narrow chip outlet channels are present, far less cracking and delamination of the microfluidic chip occur when pressurized fluids flow through the microfluidic chip, in particular in the region of the chip outlet channel. This too allows to use the microfluidic chip for high pressure applications.

In a possible embodiment, the microfluidic chip comprises a first body plate and a second body plate which are connected to each other. These body plates are for example made of glass, silicon or quartz, and form the "layers" of the microfluidic chip. The first body plate and said second body plate each have a thickness. These thicknesses can be either the same or different. Optionally, the microfluidic chip comprises more than two body plates, for example a first, a second and a third body plate.

In this embodiment, the chip inlet channel is present in the first body plate and extends through the thickness of said first body plate. The chip outlet channels are present in the first body plate and/or the second body plate and/or further body plates and extend through the thickness of said first body plate and/or said second body plate and/or further body plates. So, the chip inlet channel and the chip outlet channels are formed by through holes through either the first or the second body plate or a further body plate.

In general, the flow restrictor channels that extend between the chip inlet channel and one of the chip outlet channels are made in the planar surface of either the first and/or second body plate and/or further body plate. The flow restrictor channels therewith often extend perpendicular to the chip inlet channel and/or the chip outlet channels that are present in the same body plate of the microfluidic chip.

The body plates for example have a thickness of 1.0 mm, 0.7 mm or 0.5 mm. If the body plate has a thickness of 1.0 mm, the diameter of the chip inlet channel (if present) and any chip outlet channels that extend through the thickness of said body plate for example have a diameter of between 0.3 mm and 1.0 mm, optionally between 0.5 mm and 0.75 mm. If the body plate has a thickness of 0.7 mm, the diameter of the chip inlet channel (if present) and any chip outlet channels that extend through the thickness of said body plate for example have a diameter of between 0.2 mm and 0.7 mm, optionally between 0.3 mm and 0.4 mm. If the body plate has a thickness of 0.5 mm, the diameter of the chip inlet channel (if present) and any chip outlet channels that extend through the thickness of said body plate for example have a diameter of between 0.1 mm and 0.5 mm, optionally between 0.2 mm and 0.3 mm.

In a possible embodiment, the chip inlet channel and/or the chip outlet channel are formed by sand blasting.

When sand blasting is used to create the chip inlet channel and/or the chip outlet channels, these channels generally will have a diameter that varies over their length. In particular, they will have a conical shape. In this situation, "the diameter" as referred to in relation to the invention is to be understood as the average diameter. In a possible embodiment, the largest diameter of the chip inlet channel or chip outlet channel that has a varying diameter is the same or smaller than the length of that same channel.

In a possible embodiment, multiple flow splitters are present on a single microfluidic chip. In such an embodiment, for example one flow splitter can be used to supply a gas to the reactor assemblies and the other flow splitter to supply a liquid to the reactor assemblies. One flow splitter is optionally connected to a first fluid source and the other flow splitter to a second fluid source. The layout of the restrictor channels on the microfluidic chip optionally is such that after the fluid flow from the first fluid source is split by the first flow splitter and the fluid flow from the second fluid source is split by the second flow splitter, fluid coming from the second flow splitter is added to fluid that comes from the first flow splitter, for example by providing a fluid communication between a restrictor channel of the first flow splitter and a restrictor channel of the second flow splitter.

In a possible embodiment, the microfluidic chip is arranged in a chip holding vessel. The chip holding vessel has a vessel body.

In said vessel body, a chip chamber is present. This chip chamber accommodates the microfluidic chip therein. The chip chamber is delimited by two generally planar walls and a circumferential chamber wall. These planar walls are arranged on opposite sides of the chip chamber. The reactors are arranged outside of the chip chamber.

The vessel body further comprises a fluid supply channel having a fluid supply channel inlet and a fluid supply channel outlet. The fluid supply channel is adapted to receive fluid from the fluid source and to supply said fluid to the chip inlet channel of the microfluidic chip. The fluid supply channel inlet is in fluid communication with the fluid source and the fluid supply channel outlet is in fluid communication with the chip inlet channel.

The chip holding vessel further comprises a fluid supply channel seal that extends around the fluid supply channel outlet, and engages the microfluidic chip. The fluid supply channel seal is for example an annular shaped seal such as an O-ring.

The vessel body further comprises a plurality of fluid discharge channels. Each fluid discharge channel has a fluid discharge channel inlet and a fluid discharge channel outlet. The fluid discharge channels are adapted to receive fluid from an associated chip outlet channel and to supply said fluid to an associated reactor assembly. Each fluid discharge channel inlet is in fluid communication with said associated chip outlet channel and each fluid discharge channel outlet is in fluid communication with said associated reactor assembly.

The chip holding vessel further comprises a plurality of fluid discharge channel seals. Each fluid discharge channel seal extends around a fluid discharge channel inlet, and each fluid discharge channel seal engages the microfluidic chip.

The chip holding vessel comprises seats for the fluid supply channel seal and the fluid discharge channel seals, which seats each have a circumferential wall, a bottom and an open top, which circumferential wall supports the seal (which is either a fluid supply channel seal or a fluid discharge channel seal) that is arranged in said seat.

The circumferential wall of the seat provides extra support for the seal (which is either a fluid supply channel seal or a fluid discharge channel seal), which helps the seal to better withstand the pressure that is exerted on it by the pressurized fluid in the system, for example the reaction fluid, a purge fluid or dilution fluid. The circumferential wall of the seat also prevents the seal from deforming too much due to this pressure, which improves the sealing action.

A seat can for example be formed as a recess in a planar wall of the chip chamber, or by a collar formed on a planar wall of the chip chamber.

In a possible embodiment, the tops of the seats are at a distance from the microfluidic chip, which distance is 200 µm or less, but larger than 0 µm. Preferably between 10 µm and 150 µm, optionally between 30 µm and 70 µm. For example, the distance is between 200 µm and 50 µm.

If the tops of the seats for the fluid supply channel seal and the fluid discharge channel seals touch the microfluidic chip, there is an increased risk of breaking the microfluidic chip due to local stress concentrations at or near the point of contact between the top of the seats and the microfluidic chip. Also, many types of seals need to be clamped in axial direction in order to obtain a proper sealing action. Such a proper clamping might not be guaranteed when the top of seat touches the microfluidic chip before the seal is clamped tightly enough.

On the other hand, it is advantageous if the distance between the tops of the seats of the seals are not too far away from the microfluidic chip. If this distance is too large, the seal (which is either a fluid supply channel seal or a fluid discharge channel seal) may expand under the influence of the pressurized fluid in the system, in the area between the top of the seat and the microfluidic chip, as it is not supported in that area by the circumferential wall of the seat. As a result, the seal may slip out of its seat, which causes leakage. In practice, it appears that when the distance between the tops of the seats and the microfluidic chip is about 200 µm, the seals do not slip out of the seats.

In a possible embodiment, the diameter of the inlet chip channel and/or at least one of the outlet chip channels is 0.7 mm or less. Preferably this diameter is 0.5 mm or less, optionally between 0.2 and 0.4 mm.

In a possible embodiment, the diameter of the chip inlet channel and/or at least one of the chip outlet channels varies over the length of said channel, and wherein the average diameter of said channel is the same or less than the length of said channel, said channel optionally having a conical shape. In such embodiments, the average diameter of said channel should be interpreted as "the diameter". Optionally, in embodiments in which the diameter of the chip inlet channel and/or at least one of the chip outlet channels varies over the length of said channel, and the maximum diameter of said channel is the same or less than the length of said channel.

Optionally, the chip holding vessel is made of metal, for example stainless steel.

In a possible embodiment, the vessel body of the chip holding vessel comprises:
a base, which base comprises one of the planar walls of the chip chamber, and which base further comprises a first sealing surface, and
a cover, which cover comprises the other of the planar walls of the chip chamber, and which cover further comprises a second sealing surface, The base and the cover together enclose the chip chamber when the first and second sealing surface are in contact with each other. The chip holding vessel further comprises a circumferential seal, which is in contact with the first sealing surface with and the second sealing surface and extends around the circumference of the chip chamber. The circumferential seal helps to provide a proper sealing of the chip chamber of the chip holding vessel, which is advantageous even for those embodiments where the chip chamber is intended to be at ambient pressure during operation, as it enables a reliable detection of leaks.

The circumferential chamber wall of the chip chamber can be formed by the base or the cover, or by both the base and the cover.

Optionally, the cover and/or the base are made of metal, for example stainless steel. Optionally, the cover and/or the base are monolithic.

Preferably, the chip holding vessel encloses the microfluidic chip entirely.

Optionally, the cover and the base are connectable to each other by means of one or more fasteners, for example screws, bolts, bolts and nuts or one or more clamps.

In most embodiments, the chip holding vessel in accordance with the invention does not require any provisions for actively and/or deliberately pressurizing the chip chamber.

Optionally, the chip holding vessel or a part thereof (e.g. the chip chamber) can be temperature controlled, heated and/or cooled. For example, is can be advantageous to heat the chip holding vessel or at least the chip chamber in order to avoid condensation of gaseous fluids that flow through the microfluidic chip in the chip holding vessel. For example, the chip holding vessel or at least the chip chamber could be heated up to 200° C.-300° C. Optionally, the reactor system according to the invention comprises thermal devices for temperature control, heating and/or cooling of a chip holding vessel or a part thereof. Such thermal devices can be arranged inside or outside the chip chamber. Suitable thermal devices include for example a Peltier element, an electric heater.

Preferably, leak detection is provided in this embodiment, as thermal stresses may occur in the microfluidic chip due to heating or cooling. For example, this embodiment is combined with one or more variants of leak detection as described in this application.

In general, it is advantageous if the microfluidic chip is arranged in the chip chamber of the chip holding vessel in such a way that the microfluidic chip is not subjected to bending, in particular during operation of the reactor system. Microfluidic chips generally have a poor resistance to bending, in particular when they are made of brittle materials such as glass, silicon or quartz.

Bending loads on the microfluidic chip can be prevented by providing one or more support surfaces for the microfluidic chip. The location of these one or more support surfaces preferably takes into account the positions where the fluid supply channel seal and the fluid discharge channel seals engage the microfluidic chip. These seals engage the outer surface of the microfluidic chip. The support surfaces also engage the outer surface of the microfluidic chip, preferably at positions right opposite to the positions where the fluid supply channel seal and the fluid discharge channel seals engage the microfluidic chip.

In a possible embodiment, the fluid supply channel seal and the fluid discharge channel seals all engage the microfluidic chip on one side, and the chip holding vessel comprises a support surface that engages the microfluidic chip over the whole outer surface at the side opposite to the side where the fluid supply channel seal and the fluid discharge channel seals engage the microfluidic chip.

In a possible embodiment, the vessel body comprises an aperture, said aperture connecting the chip chamber to an ambient pressure volume, such that—during operation of the reactor system—the pressure in the chip chamber is generally ambient pressure. The ambient pressure volume can for example be the atmosphere, the inside volume of a fume cupboard, or a waste vessel or other type of vessel at generally ambient pressure.

This embodiment enables detection of leaks occurring in a microfluidic chip or in the fluid connections with the microfluidic chip. In case of a leak, the substance that leaks will escape from the chip chamber via the aperture. This can be detected for example by a flow detector. Alternatively, the aperture in the chip holding vessel can be connected to a detection conduit, which conduit has an open end opposite to the end which is connected to the aperture in the chip holding vessel. This open end of the detection conduit is submerged in a fluid. When a gaseous substance leaks from the microfluidic chip or a fluid connection with the microfluidic chip, this gaseous substance will leave the chip holding vessel via the aperture and the detection conduit. When the gaseous substance leaves the detection conduit via the open end, bubbles will form. These bubbles can then be detected, for example visually.

In case a liquid substance leaks from the microfluidic chip or a fluid connection with the microfluidic chip, this substance will leave the chip holding vessel via the aperture in the form of droplets or a flow. The droplets or the flow can then be detected, for example visually.

In a possible embodiment, the chip chamber is in fluid communication with the atmosphere via the aperture.

In a possible embodiment, the reactor system further comprises a waste vessel, which waste vessel is in fluid communication with chip chamber via the aperture.

In a possible embodiment, the reactor system further comprises a flow detector that is adapted to detect the presence of a fluid flow from the chip chamber through the aperture.

In a possible embodiment, the chip holding vessel has an outer surface, and the aperture extends from the pressure chip chamber to the chamber outer surface.

Optionally, in this embodiment the pressure chip chamber is in fluid communication with the atmosphere via the aperture (so, the atmosphere is the ambient pressure volume). This ensures that the pressure in the chip chamber is indeed substantially ambient. This variant of the embodiment is of course only suitable if non-toxic or otherwise non-harmful fluids flow through the microfluidic chip and/or if only small volumes of fluid are used, because in case of a leak in the microfluidic chip or its connections to the fluid feed channel and/or fluid discharge channels of the chip holding vessel, fluid fed to the microfluidic chip may also escape via the aperture in the chip holding vessel.

In a different variant of this embodiment, optionally the reactor system further comprises a waste vessel, e.g. an ambient pressure waste vessel, which waste vessel is in fluid communication with pressure chip chamber via the aperture. This variant is suitable if toxic or otherwise harmful fluids flow through the microfluidic chip, because in case of a leak in the microfluidic chip or its connections to the fluid feed channel and fluid discharge channels of the chip holding vessel, fluid fed to the microfluidic chip will be captured in the waste vessel. The waste vessel preferably has an inner volume that is far larger, e.g. at least 10 times larger, than the expected volume of leaked fluid, so that an influx of leaked fluid does not significantly affect the (optionally ambient) pressure in the waste vessel. The waste vessel can for example be connected to the aperture in the chip holding vessel by a safety flow line.

Optionally, the reactor system further comprises a flow detector that is adapted to detect the presence of a fluid flow from the chip chamber through the aperture. Such a fluid flow most likely points to the presence of a leak, so the flow detector can be used as a leak detector. Optionally, the flow detector is a thermal conductivity detector.

The flow detector can be arranged to detect flow directly in the aperture, but alternatively, if a waste vessel is present that is connected to the aperture in the chip holding vessel via a safety flow line, the flow detector could be arranged to detect flow in this safety flow line between the chip holding vessel and the waste vessel.

In a possible embodiment, the system comprises a chip chamber pressure detector for detecting a pressure change in the pressure in the chip chamber. Such a pressure change most likely points to the presence of a leak, so the flow detector can be used as a leak detector. This embodiment is in particular suitable for embodiments in which the aperture has a small diameter and therewith a resistance to fluid flow that prevents all leaked fluid to flow from the chip chamber right away, or where such an aperture is not present at all.

In a most embodiments, the pressurized fluid that is supplied to the reactors in the system does not enter the chip chamber: it flows through the fluid supply channel to the chip inlet channel, the flow restrictor channels, the chip outlet channels and the fluid discharge channels. The fluid supply channel seal and the fluid discharge channel seals prevent that the pressurized fluid enters the chip chamber.

Preferably, in this embodiment, the chip chamber is at ambient pressure during normal operation of the reactor system. However, in case of a leak in the microfluidic chip or a fluid connection with the microfluidic chip (e.g. at the fluid supply channel seal or one of the fluid discharge channel seals), pressure may build up in the chip chamber, in particular when the chip chamber is gastight and/or liquid tight. Optionally, the reactor system comprises a chip chamber pressure detector, e.g. a pressure sensor or a pressure gauge to detect a pressure change in the chip chamber, for example a pressure build up, which is an indication of a leak.

Keeping the chip chamber at ambient pressure during the operation of the reactor system makes to reactor system safer to operate than the known reactor systems, as operating the reactor system according to the invention this way does not involve relatively large volumes under high pressure.

In a possible embodiment, the fluid supply channel seal and/or at least one of the fluid discharge channel seals has an annular shape with a central hole. In this embodiment, the chip holding vessel further comprises at least one tubular element, which tubular element extends through the central hole of said seal. This tubular element prevents that the annular seal is deformed in such a way that the central hole would be closed.

Generally, the chip holding vessel only contains the microfluidic chip and optionally some seals or connections inside chip chamber. Reactors, valves etc. are arranged outside the chip holding vessel. This allows adequate detection of leaks in the microfluidic chips or in the connections to or from the microfluidic chips.

Optionally, the chip holding vessel encloses the microfluidic chip entirely. Known chip holding vessels often have an opening or window so that the fluid flow through the flow restrictor channel can be observed or monitored, for example with a microscope. In general this will not be necessary for the application of the microfluidic chips in the system according to the invention.

Preferably, the microfluidic chip is releasably arranged in reactor system. So, for example the microfluidic chip is preferably not glued to the vessel body and/or comprises no glued connections of e.g. flow lines.

In this embodiment, the microfluidic chip can easily be exchanged for another microfluidic chip if for example the microfluidic chip is damaged, if one or more of the flow restrictor channels are blocked, or if a microfluidic chip with different characteristics is required for a new experiment.

In the reaction system according to the invention as described in the one aspect of the present invention, the microfluidic chip fulfills the function of flow splitter. However, alternatively or in addition, microfluidic chips with flow restrictor channels may be used at other locations in the reactor system according to the invention as well, though in the system according to the invention microfluidic chips are not used to accommodate reactors.

In an alternative form of the invention, the reactor system is a reactor system for high throughput applications, which reactor system comprises:

a plurality of reactor assemblies, each reactor assembly comprising:
  a flow-through reactor, said flow-through reactor comprising a reactor inlet and a reactor outlet, which flow-through reactor is adapted to accommodate a chemical reaction,
  a reactor feed line, which reactor feed line has a first end and a second end, said second end being connected to the reactor inlet of the flow-through reactor,
  said reactor feed line being adapted to supply a fluid to the flow-through reactor,
  a reactor effluent line, which reactor effluent line has a first end, which first end is connected to the reactor outlet of the flow-through reactor,
  said reactor effluent line being adapted to discharge reactor effluent from the flow-through reactor,
a fluid source, which fluid source is adapted to provide a pressurized fluid to the flow-through reactors,
a flow path controller which is adapted to transfer said pressurized fluid from the fluid source to the reactor assemblies, so that said pressurized fluid can be used in the reactions inside the flow-through reactors,
which flow path controller is arranged downstream of the fluid source and upstream of the reactor assemblies,
which flow path controller comprises a flow path controller inlet which is in fluid communication with the fluid source and is adapted to receive the pressurized fluid from the fluid source,
which flow path controller further comprises a plurality of flow path controller outlets, each flow path controller outlet being in fluid communication with the first end of a reactor feed line of an associated reactor assembly and adapted to provide pressurized fluid from the fluid source to the associated reactor assembly,
wherein in a reactor feed line and/or reactor effluent line of at least one reactor assembly a flow restrictor channel is present, which flow restrictor channel is arranged in a planar microfluidic chip, which microfluidic chip further comprises a chip inlet channel and a chip outlet channel that are in fluid communication with the flow restrictor channel, the chip inlet channel being upstream of the flow restrictor channel and the chip outlet channel being downstream of the flow restrictor channel, both said chip inlet channel and said chip outlet channel having a length and a diameter, wherein the diameter is the same or less than the length of said channel.

This alternative reactor system according to the invention is similar to the reactor system according to the one aspect of the present invention, but the microfluidic chips are present at a different location in the system. In this alternative reactor system according to the invention, a microfluidic chip is present in a reactor feed line and/or in a reactor effluent line.

In accordance with the invention, the alternative reactor system comprises one or more flow restrictor channels. In a reactor feed line and/or reactor effluent line of at least one reactor assembly a flow restrictor channel is present, which flow restrictor channel is arranged in a planar microfluidic chip. This microfluidic chip further comprises a chip inlet channel and a chip outlet channel that are in fluid communication with the flow restrictor channel. The chip inlet channel is upstream of the flow restrictor channel and the chip outlet channel is downstream of the flow restrictor channel. Both the chip inlet channel and the chip outlet channel have a length and a diameter. In accordance with the invention, the diameter of these chip inlet channel and the chip outlet channel is the same or less than the length of said channel.

It is possible that multiple microfluidic chips are present in this alternative reactor system according to the invention, for example, one microfluidic chip in each reactor feed channel, or one microfluidic chip in each reactor effluent channel, or one microfluidic chip in each reactor feed channel and one microfluidic chip in each reactor effluent channel.

The alternative reactor system according to the invention comprises a flow path controller, for example a selection valve, a flow splitter or a manifold. The flow path controller is arranged downstream of the fluid source and upstream of the reactor assemblies. The flow path controller receives fluid from the fluid source and directs this received fluid to the reactor assemblies. Optionally, the flow path controller directs the received fluid to all reactor assemblies simultaneously, or to some of the reactor assemblies simultaneously. Alternatively, the flow path controller directs the received fluid to one reactor assembly at a time, and sequentially to all reactor assemblies.

Optionally, the reactor system according to the one aspect of the present invention and the alternative reactor system according to the invention are combined, in which combined system the flow path controller is a flow splitter being a microfluidic chip in accordance with the one aspect of the present invention.

The flow path controller comprises a flow path controller inlet which is in fluid communication with the fluid source. The flow path controller inlet is adapted to receive the pressurized fluid from the fluid source. The flow path controller inlet is in fluid communication with the fluid source.

The flow path controller further comprises a plurality of flow path controller outlets. Each flow path controller outlet is in fluid communication with an associated reactor assembly, in particular with the first end of a reactor feed line of that associated reactor assembly. Each flow path controller outlet is adapted to provide pressurized fluid from the fluid source to the associated reactor assembly.

In a possible embodiment, in the alternative system according to the invention at least one microfluidic chip is arranged in a chip holding vessel, which chip holding vessel comprises:
  a vessel body,
  in said vessel body, an chip chamber, said chip chamber accommodating the microfluidic chip therein, which chip chamber is delimited by two generally planar walls and a circumferential chamber wall, which planar walls are arranged on opposite sides of the chip chamber,
  in said vessel body, a fluid supply channel, said fluid supply channel having a fluid supply channel inlet and a fluid supply channel outlet,
  which fluid supply channel is adapted to receive fluid from the reactor feed line or reactor effluent line in which the flow restrictor channel is arranged and to supply said fluid to the chip inlet channel of the microfluidic chip,
  wherein the fluid supply channel inlet is in fluid communication with the reactor feed line or reactor effluent line in which the flow restrictor channel is arranged and the fluid supply channel outlet is in fluid communication with the chip inlet channel, and
  a fluid supply channel seal that extends around the fluid supply channel outlet, and engages the microfluidic chip, and
  in said vessel body, a fluid discharge channel, said fluid discharge channel having a fluid discharge channel inlet and a fluid discharge channel outlet,
  which fluid discharge channel is adapted to receive fluid from the chip outlet channel of the microfluidic chip and to supply said fluid to the reactor feed line or reactor effluent line in which the flow restrictor channel is arranged,
  wherein the fluid discharge channel inlet is in fluid communication with the chip outlet channel and the fluid discharge channel outlet is in fluid communication with the reactor feed line or reactor effluent line in which the flow restrictor channel is arranged, and
  a fluid discharge channel seal, that extends around the fluid discharge channel inlet, wherein said fluid discharge channel seal engages the microfluidic chip, and
  wherein the chip holding vessel comprises a seat for the fluid supply channel seal and the fluid discharge channel seal, which seats each have a circumferential wall, a bottom and an open top, which circumferential wall supports the seal that is arranged in said seat.

The optional features of the microfluidic chip, the chip holding vessel and other elements of the reactor system according to the one aspect of the present invention are optional features in the alternative reactor system as well.

For example, in a possible embodiment of the alternative reactor, the diameter of the inlet chip channel and/or the outlet chip channel of at least one microfluidic chip is 0.7 mm or less. Preferably this diameter is 0.5 mm or less, optionally between 0.2 and 0.4 mm.

As a further example, in a possible embodiment of the alternative reactor, the diameter of the chip inlet channel and/or the chip outlet channel of the microfluidic chip varies over the length of said channel, and wherein the average diameter of said channel is the same or less than the length of said channel, said channel optionally having a conical shape. In such embodiments, the average diameter of said channel should be interpreted as "the diameter". Optionally, in embodiments in which the diameter of the chip inlet channel and/or at least one of the chip outlet channels varies over the length of said channel, and the maximum diameter of said channel is the same or less than the length of said channel.

As a further example, in a possible embodiment of the alternative reactor, the microfluidic chip comprises a first body plate and a second body plate which are connected to each other. These body plates are for example made of glass, silicon or quartz, and form the "layers" of the microfluidic chip. The first body plate and said second body plate each have a thickness. These thicknesses can be either the same or different. Optionally, the microfluidic chip comprises more than two body plates, for example a first, a second and a third body plate.

In this embodiment, the chip inlet channel is present in the first body plate and extends through the thickness of said first body plate. The chip outlet channels are present in the first body plate and/or the second body plate and/or further body plates and extend through the thickness of said first body plate and/or said second body plate and/or further body plates. So, the chip inlet channel and the chip outlet channels are formed by through holes through either the first or the second body plate or a further body plate.

In general, the flow restrictor channels that extend between the chip inlet channel and one of the chip outlet channels are made in the planar surface of either the first and/or second body plate and/or further body plate. The flow restrictor channels therewith often extend perpendicular to the chip inlet channel and/or the chip outlet channels that are present in the same body plate of the microfluidic chip.

The body plates for example have a thickness of 1.0 mm, 0.7 mm or 0.5 mm. If the body plate has a thickness of 1.0 mm, the diameter of the chip inlet channel (if present) and any chip outlet channels that extend through the thickness of said body plate for example have a diameter of between 0.3 mm and 1.0 mm, optionally between 0.5 mm and 0.75 mm. If the body plate has a thickness of 0.7 mm, the diameter of the chip inlet channel (if present) and any chip outlet channels that extend through the thickness of said body plate for example have a diameter of between 0.2 mm and 0.7 mm, optionally between 0.3 mm and 0.4 mm. If the body plate has a thickness of 0.5 mm, the diameter of the chip inlet channel (if present) and any chip outlet channels that extend through the thickness of said body plate for example have a diameter of between 0.1 mm and 0.5 mm, optionally between 0.2 mm and 0.3 mm.

As a further example, in the embodiment of the alternative reactor wherein at least one microfluidic chip is arranged in a chip holding vessel, which chip holding vessel, the tops of the seats are at a distance from the microfluidic chip, which distance is 200 µm or less, but larger than 0 µm. Preferably between 10 µm and 150 µm, optionally between 30 µm and 70 µm. For example, the distance is between 200 µm and 50 µm.

Optionally, the alternative reactor system according to the invention further comprises a valve system, which allows to block the fluid flow to a microfluidic chip in relation to which a leak has been detected.

In a possible embodiment of the alternative reactor system according to the invention, the chip holding vessel comprises a single chip chamber, and said chip chamber is adapted to accommodate a single microfluidic chip.

In a possible embodiment of the alternative reactor system according to the invention, the chip holding vessel comprises a single chip chamber, and said chip chamber is adapted to accommodate multiple microfluidic chips. In this embodiment, the chip holding vessel comprises multiple fluid supply channels and multiple fluid discharge channels, wherein each fluid supply channel and each fluid discharge channel is associated with a flow restrictor channel of a microfluidic chip.

In a possible embodiment of the alternative reactor system according to the invention, the chip holding vessel comprises multiple chip chambers, and each chip chamber is adapted to accommodate a single microfluidic chip. In this embodiment, the chip holding vessel comprises multiple fluid supply channels and multiple fluid discharge channels, wherein each fluid supply channel and each fluid discharge channel is associated with a flow restrictor channel of a microfluidic chip.

BRIEF DESCRIPTION OF THE DRAWINGS

The invention will be described in more detail below under reference to the drawings, in which in a non-limiting manner exemplary embodiments of the invention will be shown.

The drawings shows in.

DETAILED DESCRIPTION OF THE INVENTION

Figure 1:
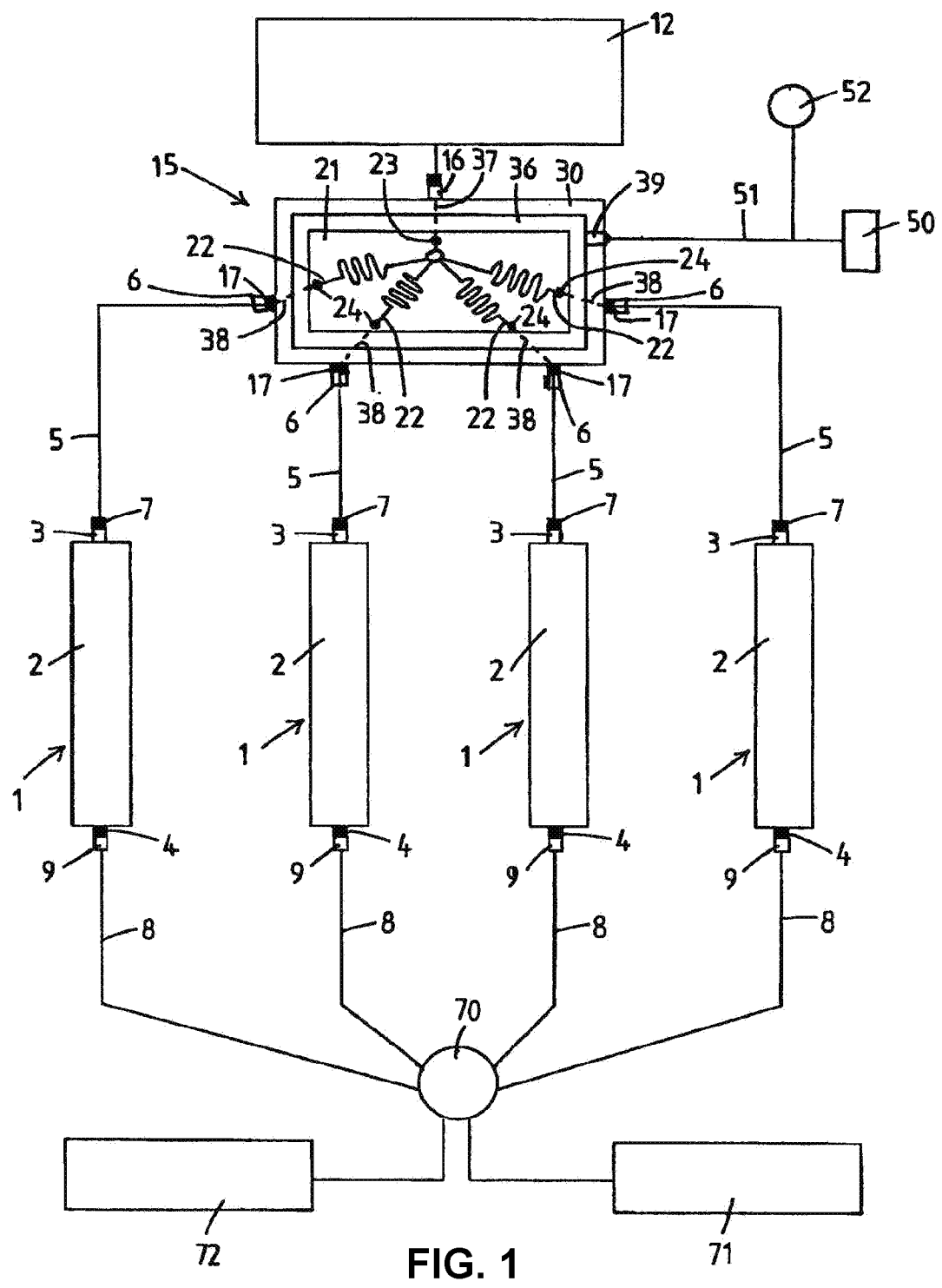
FIG. 1: a schematic overview of a first embodiment a reactor system according to the invention.

FIG. 1 shows a schematic overview of a first embodiment a reactor system according to the invention.

The reactor system of FIG. 1 comprises four reactor assemblies 1. It is however possible that the reactor system according to the invention comprises any other number of reactor assemblies, although generally there will be more than one reactor assembly.

Each reactor assembly 1 comprises a flow-through reactor 2, a reactor feed line 5 and a reactor effluent line 8. The flow-through reactors 2 all have a reactor inlet 3 and a reactor outlet 4. The reactor feed lines 5 all have a first end 6 and a second end 7. The reactor effluent lines 8 all have a first end 9. In each reactor assembly 1, the second end 7 of the reactor feed line 5 is connected to the reactor inlet 3, and the first end 9 of the reactor effluent line 8 is connected to the reactor outlet 4.

The reactor system of FIG. 1 further comprises a fluid source 12, which is adapted to provide a pressurized fluid to the flow-through reactors 2. The reactor system according to the invention is suitable for operation at high fluid pressures, for example about 20 bar or more, about 30 bar or more, about 30 bar to 100 bar or about 30 bar to 300 bar reactor pressure. The reactor system being suitable for operation at these high pressures for example means that the wall thickness of the structural elements that are in contact with pressurized fluid in the system are sufficient to maintain the structural integrity of the system at these high pressures. Further, for example, the seals and/or valves that are used are also suitable for high pressure operations.

The reactor system according to FIG. 1 further comprises a flow splitter 15. As can be seen in FIG. 1, the flow splitter 15 is arranged downstream of the fluid source 12 and upstream reactor assemblies. The flow splitter comprises a planar microfluidic chip 21 which is arranged in an chip chamber 36 of a chip holding vessel 30. The chip holding vessel 30 is for example a chip holding vessel 30 of the type shown in FIG. 2A.

The microfluidic chip 21 that is used in the flow splitter in this embodiment, comprises a chip inlet channel 23 that is in fluid communication with a plurality of flow restrictor channels 22. The flow restrictor channels 22 are in this embodiment also arranged in the microfluidic chip 21. Each flow restrictor channel 22 is in fluid communication with a chip outlet channel 24.

The chip inlet channel 23 is in fluid communication with the fluid source 12 and is adapted to receive the pressurized fluid from the fluid source. The pressurized fluid is for example a reaction fluid, a purge fluid, or a dilution fluid.

Each chip outlet channel 24 is in fluid communication with the first end 6 of a reactor feed line 5 of an associated reactor assembly 1 and adapted to provide pressurized fluid from the fluid source to the associated reactor assembly, thereby making said pressurized fluid available for the reaction in the flow-through reactor 2.

The chip inlet channel 23 and the chip outlet channels 24 each have a diameter, which diameter is the same or less than the length of said channel 23,24.

The chip holding vessel 30 in this embodiment has a fluid supply channel 37 and a plurality of fluid discharge channels 38. The fluid supply channel 37 is in fluid communication with the chip inlet channel 23. The fluid discharge channels 38 are in fluid communication with an associated chip outlet channel 24.

The inlet of the fluid supply channel 37 is in fluid communication with the fluid source 12 and receives pressurized fluid from this fluid source 12. The outlet of each fluid discharge channel 38 is in fluid communication with the first end 6 of a reactor feed line 5 of an associated reactor assembly 1. The associated reactor assembly 1 receives the pressurized fluid though the outlet of the associated fluid discharge channel 38.

In the embodiment of FIG. 1, the reactor effluent is discharged from the reactors 2 by the effluent lines 8. For example, the effluent lines are connected to a selection valve 70, which directs the effluent flow of one of the reactors 2 to an analyzer 71 and the other flows to waste 72. Sequentially, one-by-one all effluent flows are directed to the analyzer 71 so all effluent flows can sequentially be analyzed individually.

In the embodiment of FIG. 1, the chip holding vessel 30 is provided with an aperture 39. This aperture 39 can provide fluid communication between the chip chamber 36 and for example the outside atmosphere.

Alternatively, optionally the reactor system further comprises a waste vessel 50, which waste vessel 50 is in fluid communication with the associated chip chamber 36 via the aperture 39 and a safety line 51. These optional features are shown in FIG. 1.

Optionally the safety flow line 51 is equipped with a flow detector 52, for example a thermal conductivity detector, that is adapted to detect a fluid flow through the safety flow line 51 from the chip chamber 36 to the ambient pressure waste vessel 50. Such a flow indicates the presence of a leak in the microfluidic chip or in its connections to the fluid feed channel and fluid discharge channel of the chip holding vessel.

Optionally, the waste vessel 50 is an ambient pressure waste vessel 50. An ambient pressure waste vessel operates at ambient pressure or generally ambient pressure during the operation of the reactor system according to the invention. In case of a leak in the microfluidic chip or in its connections to the fluid feed channel and fluid discharge channel of the chip holding vessel, the leaking fluid is safely discharged via the safety flow line 51 to the ambient pressure waste vessel.

Preferably, the ambient pressure waste vessel has a large inner volume for receiving any leaked fluid, so that any influx of leaked fluid does not make that the pressure inside the ambient pressure waste vessel rises significantly above ambient pressure. In practice, this could for example be realized with an ambient pressure waste vessel that has a volume of at least ten times the volume of fluid that is used during an experiment.

Figure 2A:
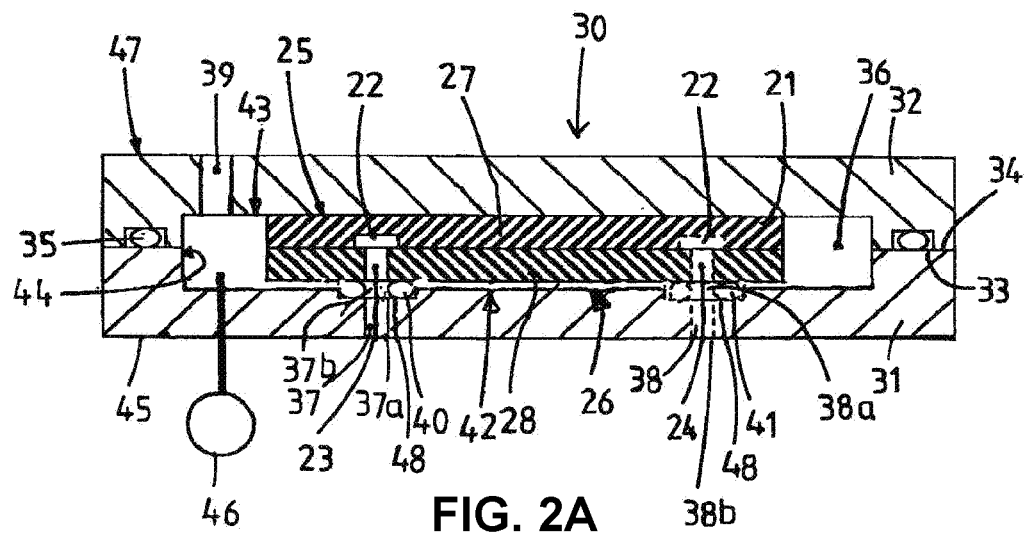
FIG. 2A: an example of a microfluidic chip in a chip holding vessel according to the invention, in cross section, FIG. 2B showing a detail.

FIG. 2A shows an example of a microfluidic chip 21 in a first possible embodiment of a chip holding vessel 30 according to the invention, in cross section.

The microfluidic chip 21 is in this example made up out of a first body plate 27 and a second body plate 28 of fluid resistant material, for example glass, quartz, silicon or metal. A flow restrictor channel 22 has been made at the interface of the body plates 27, 28, for example by etching the channel into one or both body plates. The first body plates 27 and the second body plates 28 are bonded together to form the microfluidic chip 21. The material of the first and second body plates 27, 28 is for example glass, quartz, silicon or metal.

The microfluidic chip 21 further comprises a chip inlet channel 23 and a plurality of chip outlet channels 24 (one of which is shown in phantom). The microfluidic chip 21 further has a first planar wall 26 and a second planar wall 25.

In the example of FIG. 2A, the chip inlet channel 23 and the chip outlet channels 24 all extend between the flow restrictor channel 22 and the first planar surface 26. Alternatively, it is possible that both the chip inlet channel 23 and the chip outlet channels 24 extend between the flow restrictor channel 22 and the second planar surface 25, or that one or more of the chip inlet channel 23 and the chip outlet channels 24 extend between the flow restrictor channel 22 and the first planar surface 26 and the other or others of the chip inlet channel 23 and the chip outlet channel 24 extend between the flow restrictor channel 22 and the second planar surface 25.

The chip holding vessel has a body 47 with an outer surface 45. The chip holding vessel 30 comprises an chip chamber 36 in the body 47 in which chip chamber 36 the microfluidic chip 21 is arranged. The chip chamber 36 is during operation of the reactor system preferably unpressurized, so the chip chamber 36 is during operation of the reactor system at ambient pressure, not at an elevated pressure.

The chip chamber 30 is delimited by a first planar chamber wall 42, a second planar chamber wall 43 and a circumferential chamber wall 44.

The body 47 of the chip holding vessel 30 further comprises a fluid supply channel 37 and a plurality of fluid discharge channels 38, of which one is shown in FIG. 2A. The fluid supply channel 37 comprises a fluid supply channel inlet 37a and a fluid supply channel outlet 37b. Each fluid discharge channel 38 comprises a fluid discharge channel inlet 38a and a fluid discharge channel outlet 38b.

The fluid supply channel 37 is adapted to receive fluid from the fluid source 12 and to supply said fluid to the flow restrictor channel 22 of the microfluidic chip 21. The fluid supply channel inlet 37a is in fluid communication with the fluid source 12 and the fluid supply channel outlet 37b is in fluid communication with the chip inlet channel 23.

Each fluid discharge channel 38 is adapted to receive fluid from the flow restrictor channel 22 of the microfluidic chip 21 and to supply said fluid to an associated reactor assembly 1. Generally, the "associated reactor assembly" is a different reactor assembly for each fluid discharge channel 38. Generally, each chip outlet channel 24 is in fluid communication with a different fluid discharge channel 38, and in turn each fluid discharge channel 38 is in fluid communication with a different reactor assembly 1.

The fluid discharge channel inlet 38a is in fluid communication with the chip outlet channel 24 and the fluid discharge channel outlet 38b is in fluid communication with the associated reactor assembly 1.

As illustrated in the embodiment of FIG. 2A, the chip holding vessel 30 further comprises a fluid supply channel seal 40. This fluid supply channel 40 is arranged between the fluid supply channel outlet and the chip inlet channel 23. The fluid supply channel seal 40 extends around the fluid supply channel outlet and engages the microfluidic chip 21. For example, the fluid supply channel seal 40 is an annular shaped, optionally compressible seal such as an O-ring.

Furthermore, the chip holding vessel 30 further comprises a fluid discharge channel seal 41. The fluid discharge channel seal 41 is arranged between the chip outlet channel 24 and the fluid discharge channel inlet. The fluid discharge channel seal 41 extends around the fluid discharge channel inlet and engages the microfluidic chip 21. For example, fluid discharge channel seal 41 is an annular shaped, optionally compressible seal such as an O-ring.

Figure 2B:
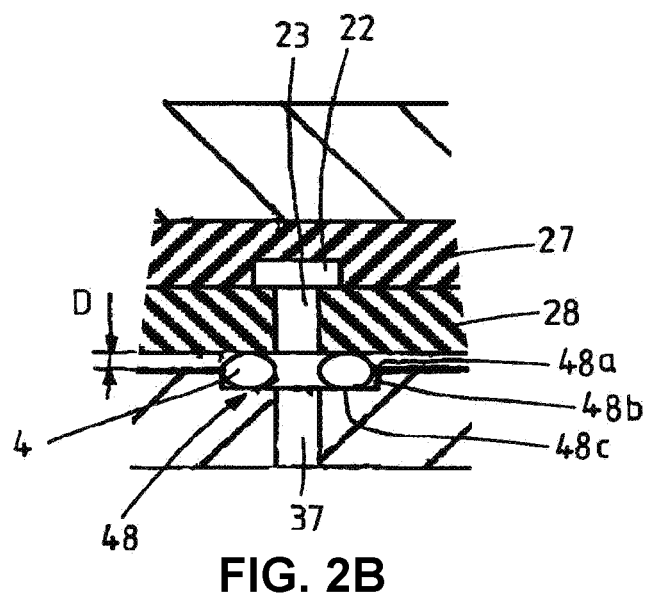

The chip holding vessel 30 comprises seats 48 for the fluid supply channel seal and the fluid discharge channel seals, which seats each have a circumferential wall 48b, a bottom 48c and an open top 48a, which circumferential wall 48b supports the seal 40, 41 that is arranged in said seat 48. FIG. 2B shows this in more detail.

Preferably, the tops 48a of the seats 48 are at a distance from the microfluidic chip 21, as indicated by D in FIG. 2B. Advantageously, this distance D is 200 μm or less but larger than 0 μm. Preferably the distance D is between 10 μm and 150 μm, optionally between 30 μm and 70 μm.

FIG. 2B shows the situation for the fluid supply channel 37, the fluid supply channel seal 40 and the chip inlet channel 23. The situation is the same or at least similar for each fluid discharge channel 38, fluid discharge channel seal 41 and chip outlet channel 24.

Figure 3:
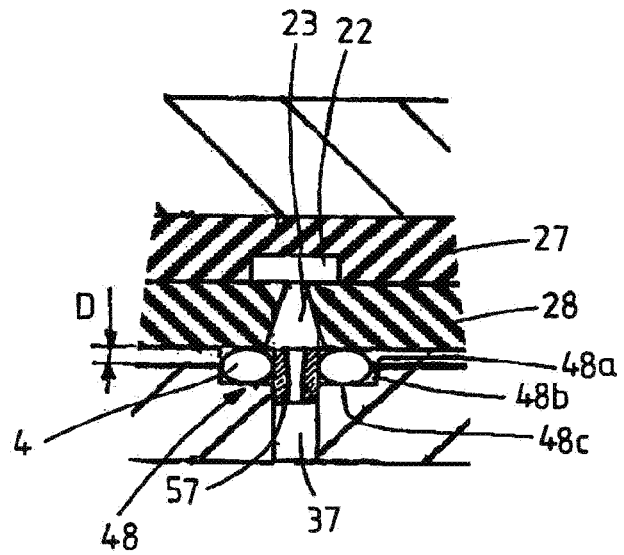
FIG. 3: a detail of an example of a microfluidic chip in a further possible embodiment of a chip holding vessel according to the invention.

FIG. 3 shows a variant in which the chip inlet channel 23 has a diameter that varies over its length. In accordance with the invention, the average diameter of the chip inlet channel 23 is smaller than the length of the chip inlet channel. In the variant of FIG. 3, even the largest diameter of the chip inlet channel is smaller than the length of the chip inlet channel 23. Alternatively or in addition, one or more of the chip outlet channels 24 can have such a shape as well. In a further variant, only one or more of the chip outlet channels 24 have such a shape.

Furthermore, in the variant of FIG. 3, the fluid supply channel inlet seal 40 is an annular O-ring with a central hole. A tubular element 57 is present that extends through the central hole of the seal 40. The tubular element makes sure that the central hole in the seal 40 remains open. A tubular embodiment 57 can also be present in any of the other embodiments shown, in combination with a fluid supply channel seal 40 and/or in combination with a fluid discharge channel seal 41.

Figure 4:
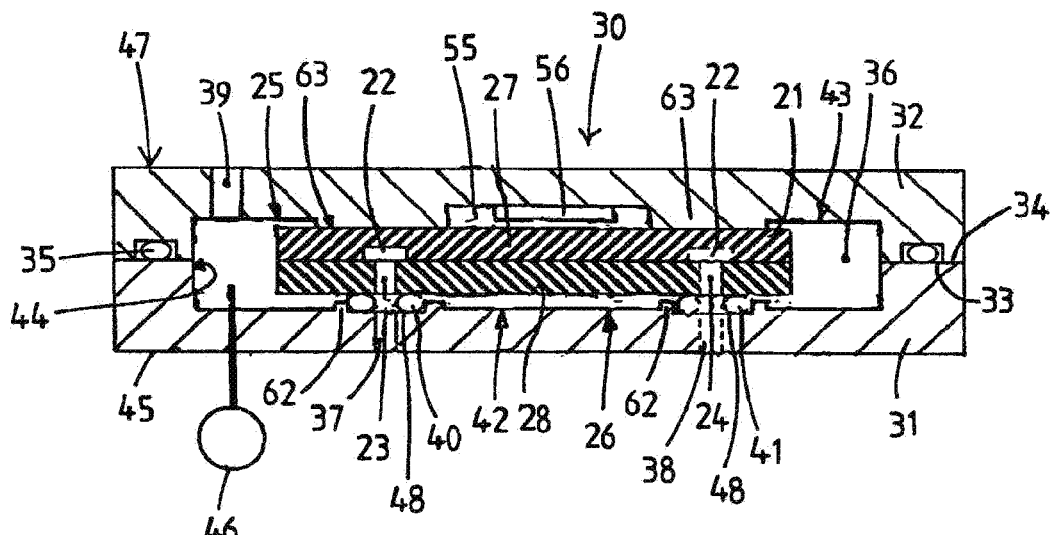
FIG. 4: an example of a microfluidic chip in a further possible embodiment of a chip holding vessel according to the invention.

The features of the embodiment of FIG. 3, in particular the tubular element 57 and the chip inlet channel and/or chip outlet channel with the varying diameter can also be applied in different embodiments of the chip holding vessel, e.g. in the embodiments of FIG. 2 and FIG. 4.

In the embodiment of FIG. 2A, the body of the chip holding vessel 30 further comprises an aperture 39 that extends between the outer surface 45 of the body of the chip holding vessel 30 and the chip chamber 36. The aperture 39 can for example be in fluid communication with the atmosphere, or with a safety flow line 51 that connects the chip chamber 36 of the chip holding vessel 30 to a waste vessel 50. In an embodiment a flow detector 52 is provided to monitor any flow out of the chamber 36 via the aperture 36, e.g. via the flow line 51 as shown in FIG. 1.

As illustrated here, the body of the chip holding vessel 30 forms a closed chamber 36. Optionally, it is connected to an ambient pressure volume via the aperture 39 in the body.

As shown in FIG. 2A, optionally, the chip holding vessel 30 is provided with a chip chamber pressure sensor 46.

In the embodiment of FIG. 2A, the chip holding vessel 30 comprises a base 31 and a cover 32. The base 31 has a first sealing surface 33. The cover 32 has a second sealing surface 34. The first sealing surface 33 and the second sealing surface 34 are in contact with each other when the chip holding vessel 30 is in use and encloses the microfluidic chip 21. A circumferential seal 35, for example a compressible seal such as an O-ring, has been provided to ensure that in case of a leak in the microfluidic chip or in its connections to the fluid feed channel and fluid discharge channel of the chip holding vessel, all leaked fluid either stays in the chip chamber 36 or leaves the chip chamber 36 via the aperture 39. This aids in obtaining a safe operation of the system, and as explained herein may allow for a fast and reliable leak detection.

The base 31 comprises the first planar wall 42 of the chip chamber 36, which wall 42 is provided with the seats 48 for the fluid supply channel seal 40 and the fluid discharge channel seals 41. The cover comprises the second planar wall 43 of the chip chamber 36, which wall 43 has a planar surface area against which the microfluidic chip 21 bears. The cover and base here also each form a part of the circumferential chamber wall, but this wall may also be formed by just one of the base and the cover, or be embodied as yet another part of the body of the chip holding vessel.

Preferably, both the base 31 and the cover 32 are made of metal, for example steel or stainless steel. Preferably, both the base 31 and the cover 32 are made as monolithic body parts in order to reduce the presence of seams in the body of the chip holder vessel.

The base 31 and the cover 32 can for example be connected to each other by means of screws, bolts and/or one or more clamps.

FIG. 4 shows an example of a microfluidic chip 21 in a second possible embodiment of a chip holding vessel 30 according to the invention, in cross section.

The embodiment of FIG. 4 is similar to the embodiment of FIG. 2A, but the first planar wall 42 and the second planar wall 43 of the vessel body are shaped differently.

In the first planar wall 42, the seats 48 for the fluid supply channel seal 40 and the fluid discharge channel seals 41 are not shaped as recesses like in the embodiment of FIG. 4. Rather, the planar wall 42 has been provided with collars 62 that form the seats 48 and support the seals 40,41 in axial and radial direction.

In the embodiment of FIG. 4, the second planar wall 43 is provided with support surfaces 63 that support the microfluidic chip 21 right opposite to the location where the fluid supply channel seal 40 and the fluid discharge channel seals 41 engage the microfluidic chip 21. This prevents bending of the microfluidic chip 21, and therewith takes away an important cause of potential failure of the microfluidic chip 21.

In the embodiment of FIG. 4, the second planar wall 43 is further provided with a recess 55 so that a space is formed in which for example a thermal device 56 such as a heater or cooler can be arranged. Because the chip holding vessel will generally have a small volume, its temperature can be changed quite easily and rapidly.

Figure 5:
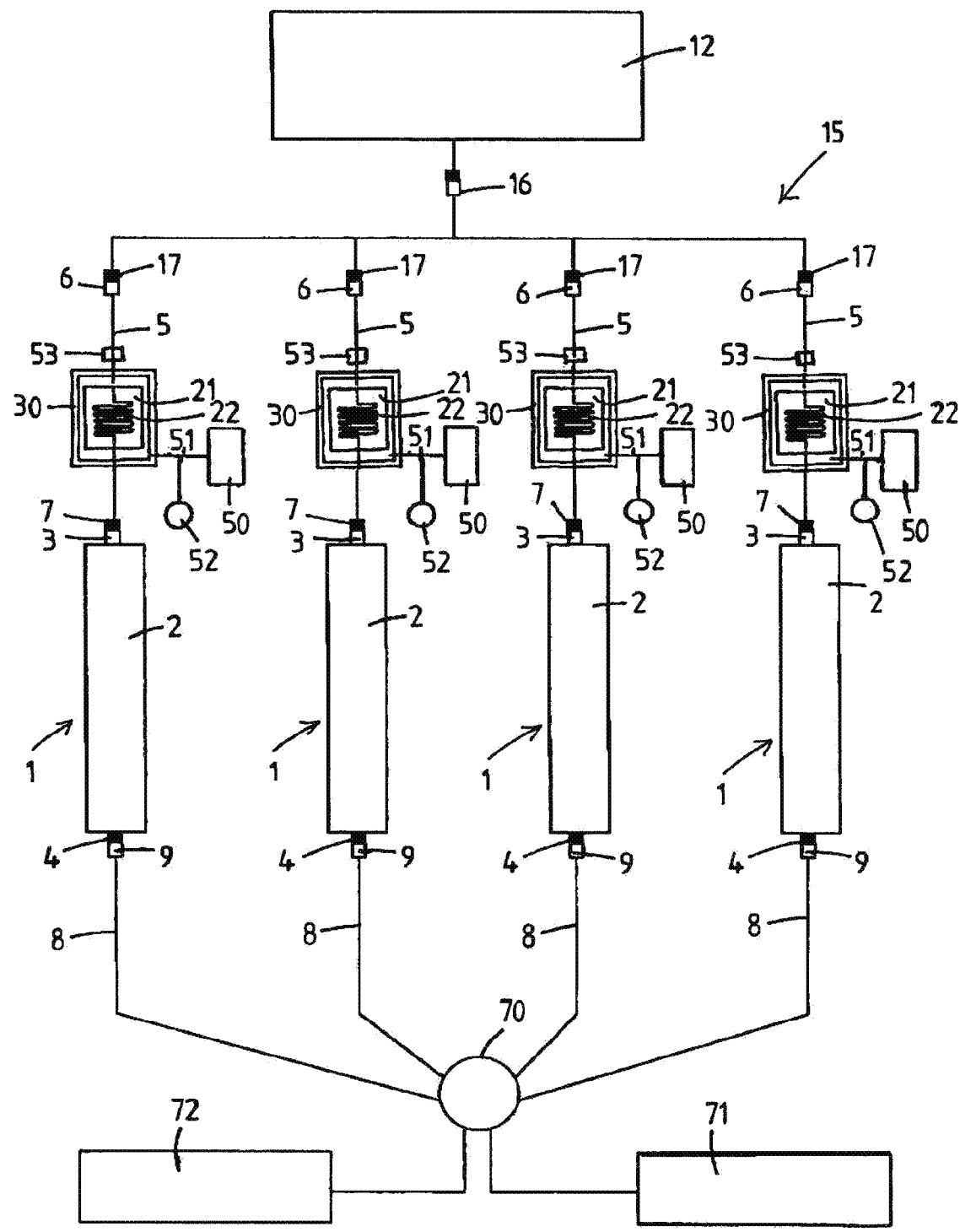
FIG. 5: a schematic overview of a first embodiment an alternative reactor system according to the invention.

FIG. 5 shows a schematic overview of a first embodiment of an alternative reactor system according to the invention. In this alternative reactor system according to the invention, the microfluidic chip 21 is present in one or more reactor feed lines or reactor effluent lines.

The reactor system of FIG. 5 comprises four reactor assemblies 1. It is however possible that the reactor system according to the invention comprises any other number of reactor assemblies, although generally there will be more than one reactor assembly.

Each reactor assembly 1 comprises a flow-through reactor 2, a reactor feed line 5 and a reactor effluent line 8. The flow-through reactors 2 all have a reactor inlet 3 and a reactor outlet 4. The reactor feed lines 5 all have a first end 6 and a second end 7. The reactor effluent lines 8 all have a first end 9. In each reactor assembly 1, the second end 7 of the reactor feed line 5 is connected to the reactor inlet 3, and the first end 9 of the reactor effluent line 8 is connected to the reactor outlet 4.

The reactor system of FIG. 5 further comprises a fluid source 12, which is adapted to provide a pressurized fluid to the flow-through reactors 2. The reactor system according to the invention is suitable for operation at high fluid pressures, for example about 20 bar or more, about 30 bar or more, about 30 bar to 100 bar or about 30 bar to 300 bar reactor pressure. The reactor system being suitable for operation at these high pressures for example means that the wall thickness of the structural elements that are in contact with pressurized fluid in the system are sufficient to maintain the structural integrity of the system at these high pressures. Further, for example, the seals and/or valves that are used are also suitable for high pressure operations.

The reactor system of FIG. 5 further comprises a flow path controller 15. In the embodiment of FIG. 5, the flow path controller 15 is a manifold that distributes pressurized fluid from the fluid source 12 over the reactor assemblies 1. In this embodiment, the pressurized fluid from the fluid source 12 is provided to all reactor assemblies 1 simultaneously.

The flow path controller 15 comprises a flow path controller inlet 16 and multiple flow path controller outlets 17. Each flow path controller outlet 17 is in fluid communication with the first end 6 of a reactor feed line 5 of an associated reactor assembly 1. The associated reactor assembly 1 receives the pressurized fluid though the flow path controller outlet 17.

The reactor system of FIG. 5 further comprises a flow restrictor channel 22 in each reactor feed line 5. The flow restrictor channel 22 is provided in a planar microfluidic chip 21, which is schematically indicated in FIG. 5. In the embodiment of FIG. 5, multiple microfluidic chips 21 are present and each microfluidic chip comprises a flow restrictor channel 22, a chip inlet channel and a chip outlet channel. The flow restrictor channel extends in a flow restrictor channel plane. The chip inlet channel and chip outlet channel extend substantially perpendicular to the flow restrictor plane. The diameter of the chip inlet channel is the same or smaller than the length of the chip inlet channel. The diameter of the chip outlet channel is the same or smaller than the length of the chip outlet channel. The microfluidic chip further comprises a first planar surface and a second planar surface, which first planar surface and second planar surface are located on opposite sides of the microfluidic chip and extend substantially parallel to the flow restrictor channel plane.

In the embodiment of FIG. 5, each microfluidic chip 21 is arranged in an associated chip holding vessel 30, which is schematically indicated in FIG. 5. FIGS. 2A, 3 and 4 show possible embodiments of the chip holding vessel in more detail. When a chip holding vessel like the one shown in FIG. 2A, 3 or 4 are used, number of fluid supply channels in the chip holding vessel will match the number of chip inlet channels of the microfluidic chip or microfluidic chips present in the chip holding vessel, and the number of fluid discharge channels in the chip holding vessel will match the number of chip outlet channels of the microfluidic chip or microfluidic chips present in the chip holding vessel. The chip holding vessels 30 all have an chip chamber in which a microfluidic chip is arranged.

In the embodiment of FIG. 5, optionally the chip chamber of each chip holding vessel 30 is in fluid communication with a waste vessel 50 via safety flow line 51. The waste vessel 50 preferably operates at ambient pressure or generally ambient pressure during the operation of the reactor system according to the invention. In case of a leak in the microfluidic chip or in its connections to the fluid feed channel and fluid discharge channel of the chip holding vessel, the leaking fluid is safely discharged via the safety flow line 51 to the waste vessel 50.

Preferably, the waste vessel 50 has a large inner volume for receiving any leaked fluid, so that any influx of leaked fluid does not make that the pressure inside the waste vessel 50 rises significantly above ambient pressure. In practice, this could for example be realized with an ambient pressure waste vessel that has a volume of at least ten times the volume of fluid that is used during an experiment.

In the embodiment of FIG. 5, optionally the safety flow line 51 is equipped with a flow detector 52, for example a thermal conductivity detector, that is adapted to detect a fluid flow through the safety flow line 51 from the chip chamber 36 to the waste vessel 50. Such a flow indicates the presence of a leak in the microfluidic chip or in its connections to the fluid feed channel and fluid discharge channel of the chip holding vessel.

Optionally, as shown in FIG. 5, a valve system is provided in order to reduce the effects of leakage of one or more of the microfluidic chips. Such a valve system for example comprises shut-off valves 53 in each reactor feed line 5, that can close the reactor feed line 5 in which that valve 53 is arranged in case a leak is detected by the flow detector 52 that is associated with the chip holding vessel 30 in the same reactor feed line 5. For example, these shut-off valves 53 are electronically controlled on the basis of a signal from the flow detector 52 so as to close the feed line 5 automatically when a flow is detected by flow detector 52.

In the embodiment of FIG. 5, the reactor effluent is discharged from the reactors 2 by the effluent lines 8. For example, the effluent lines are connected to a selection valve 70, which directs the effluent flow of one of the reactors 2 to an analyzer 71 and the other flows to waste 72. Sequentially, one-by-one all effluent flows are directed to the analyzer 71 so all effluent flows can sequentially be analyzed individually.

Figure 6:
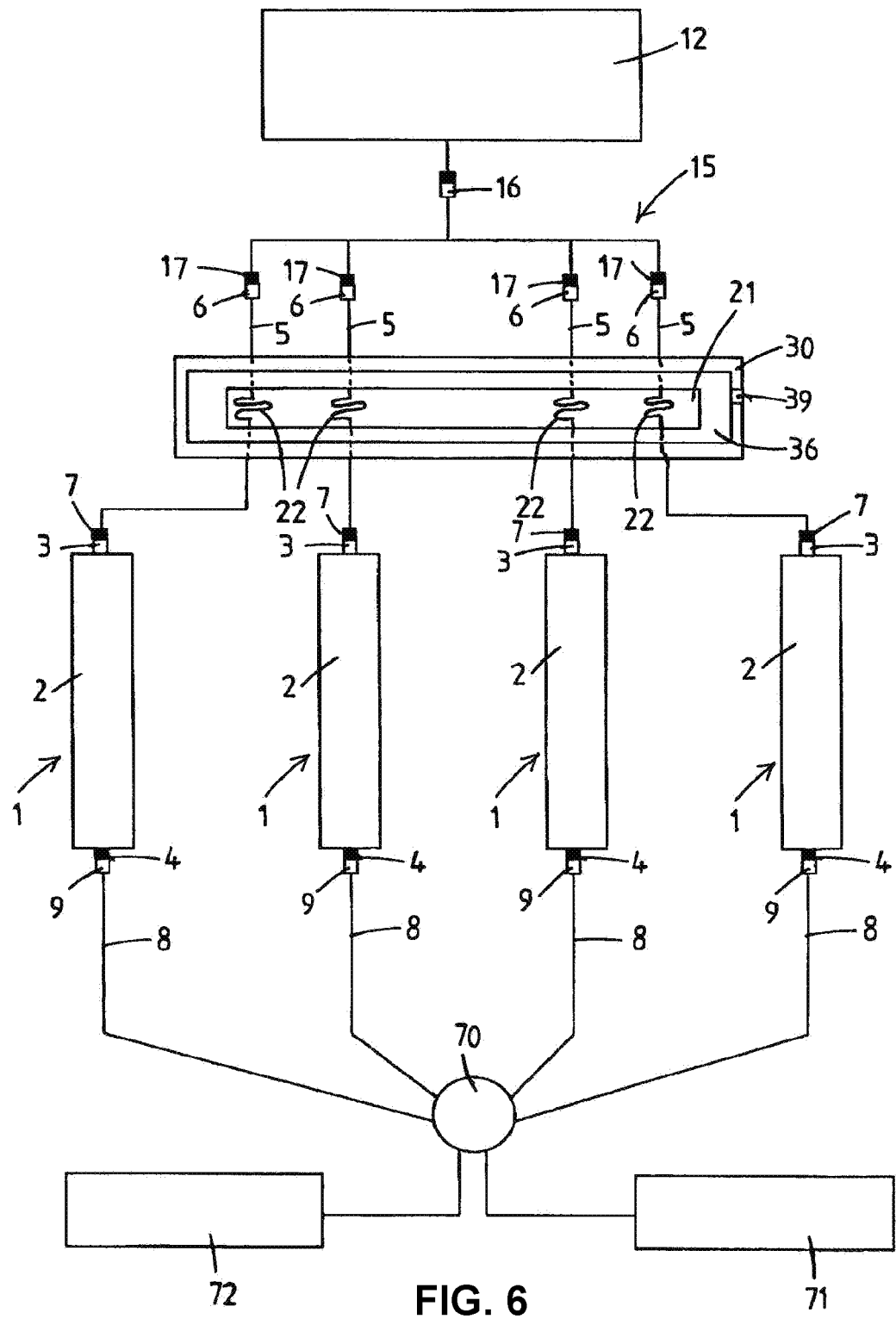
FIG. 6: a further embodiment of an alternative reactor system according to the invention.

FIG. 6 shows a further embodiment of an alternative reactor system according to the invention.

The embodiment of FIG. 6 is similar to the embodiment of FIG. 5, but in the embodiment of FIG. 6, a microfluidic chip 21 is present that comprises multiple flow restrictor channels 22. The embodiment of FIG. 6 can have a single microfluidic chip 21 that comprises all flow restrictor channels 22 in all reactor feed lines 5 of the reactor system. Alternatively, multiple microfluidic chips 21 are present of which at least one comprises multiple flow restrictor channels 22.

In the embodiment shown in FIG. 6, the flow restrictor channels 22 are arranged in the reactor feed lines 5. Alternatively or in addition, flow restrictor channels 22 may be present in the reactor effluent lines 8.

The reactor system of FIG. 6 comprises four reactor assemblies 1. It is however possible that the reactor system according to the invention comprises any other number of reactor assemblies, although generally there will be more than one reactor assembly.

Each reactor assembly 1 comprises a flow-through reactor 2, a reactor feed line 5 and a reactor effluent line 8. The flow-through reactors 2 all have a reactor inlet 3 and a reactor outlet 4. The reactor feed lines 5 all have a first end 6 and a second end 7. The reactor effluent lines 8 all have a first end 9. In each reactor assembly 1, the second end 7 of the reactor feed line 5 is connected to the reactor inlet 3, and the first end 9 of the reactor effluent line 8 is connected to the reactor outlet 4.

The reactor system of FIG. 6 further comprises a fluid source 12, which is adapted to provide a pressurized fluid to the flow-through reactors 2. The reactor system according to the invention is suitable for operation at high fluid pressures, for example about 20 bar or more, about 30 bar or more, about 30 bar to 100 bar or about 30 bar to 300 bar reactor pressure. The reactor system being suitable for operation at these high pressures for example means that the wall thickness of the structural elements that are in contact with pressurized fluid in the system are sufficient to maintain the structural integrity of the system at these high pressures. Further, for examples, the seals and/or valves that are used are also suitable for high pressure operations.

The reactor system of FIG. 6 further comprises a flow path controller 15. In the embodiment of FIG. 6, the flow path controller 15 is a manifold that distributes pressurized fluid from the fluid source 12 over the reactor assemblies 1. In this embodiment, the pressurized fluid from the fluid source 12 is provided to all reactor assemblies 1 simultaneously.

The flow path controller 15 comprises a flow path controller inlet 16 and multiple flow path controller outlets 17. Each flow path controller outlet 17 is in fluid communication with the first end 6 of a reactor feed line 5 of an associated reactor assembly 1. The associated reactor assembly 1 receives the pressurized fluid though the flow path controller outlet 17.

The reactor system of FIG. 6 further comprises a flow restrictor channel 22 in each reactor feed line 5. The microfluidic chip comprises a flow restrictor channel 22, a chip inlet channel and a chip outlet channel. The flow restrictor channel extends in a flow restrictor channel plane. The chip inlet channel and chip outlet channel extend substantially perpendicular to the flow restrictor plane. The diameter of the chip inlet channel is the same or smaller than the length of the chip inlet channel. The diameter of the chip outlet channel is the same or smaller than the length of the chip outlet channel. The flow restrictor channels 22 are provided in a microfluidic chip 21 that is arranged in a chip holding vessel 30, which is schematically indicated in FIG. 6. FIGS. 2A, 3 and 4 show possible embodiments of the chip holding vessel in more detail. When a chip holding vessel like the one shown in FIG. 2A, 3 or 4 are used, number of fluid supply channels in the chip holding vessel will match the number of chip inlet channels of the microfluidic chip or microfluidic chips present in the chip holding vessel, and the number of fluid discharge channels in the chip holding vessel will match the number of chip outlet channels of the microfluidic chip or microfluidic chips present in the chip holding vessel. The chip holding vessel has a chip chamber 36 in which the microfluidic chip is arranged.

In the embodiment of FIG. 6, the chip chamber 36 of each chip holding vessel 30 is provided with an aperture 39. Optionally, the chip chamber 36 is in fluid communication with the atmosphere via the aperture 39. Alternatively, the reactor system further comprises an ambient pressure waste vessel, which ambient waste vessel is in fluid communication with chip chamber via the aperture 39 and a safety line, like is shown in FIG. 5.

In case leak detection is applied, for example using a flow sensor or pressure sensor as described before, leaks in the microfluidic chip or in one or more of the connections to the microfluidic chip can be detected. Generally, it will not be possible in this embodiment to determine which flow restrictor channel or which connection to the microfluidic chip 21 in the chip chamber 36 is leaking.

In the embodiment of FIG. 6, the reactor effluent is discharged from the reactors 2 by the effluent lines 8. For example, the effluent lines are connected to a selection valve 70, which directs the effluent flow of one of the reactors 2 to an analyzer 71 and the other flows to waste 72. Sequentially, one-by-one all effluent flows are directed to the analyzer 71 so all effluent flows can sequentially be analyzed individually.

Figure 7:
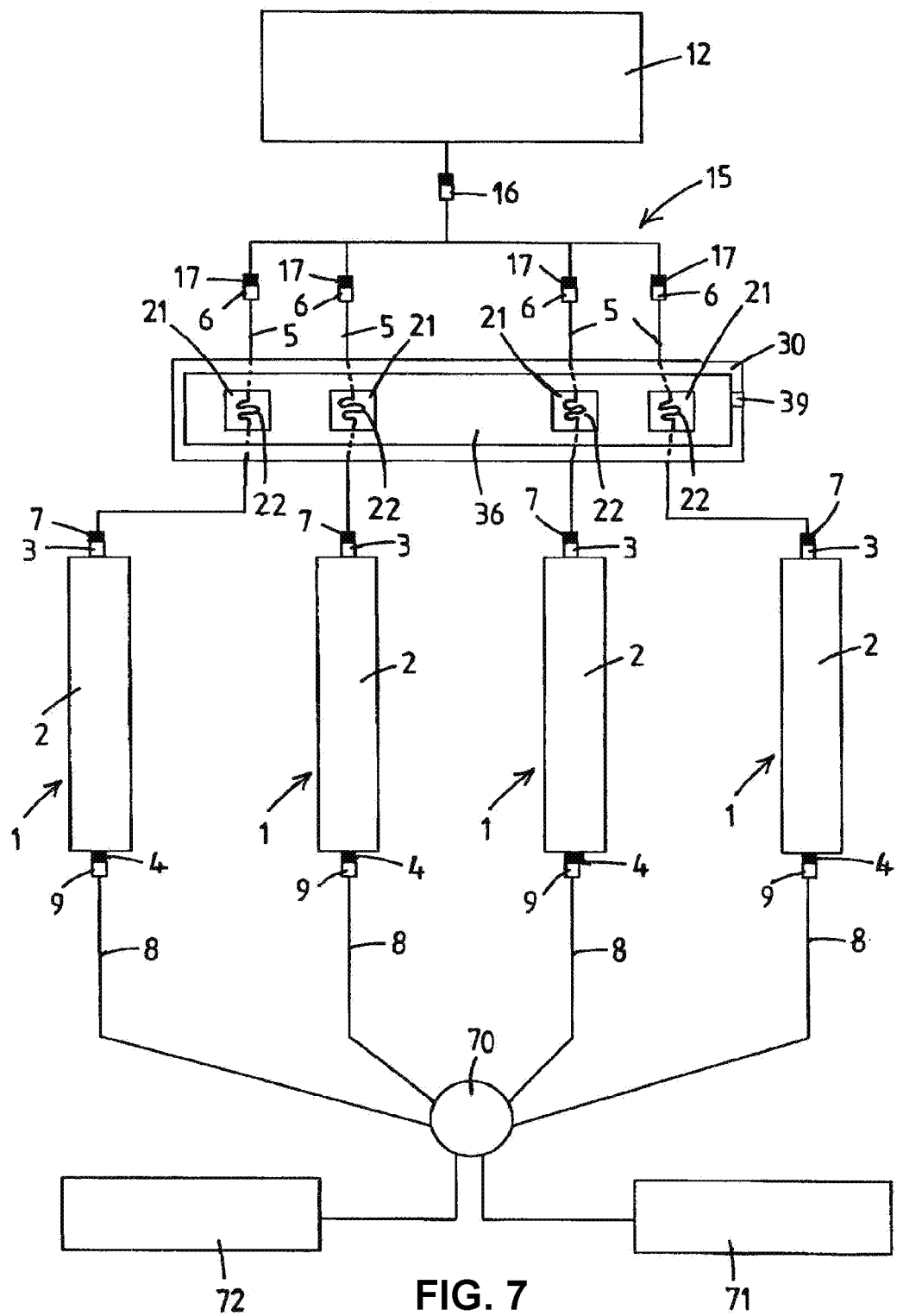
FIG. 7: a further embodiment of an alternative reactor system according to the invention.

FIG. 7 shows a further embodiment of an alternative reactor system according to the invention.

The embodiment of FIG. 7 is similar to the embodiment of FIG. 5 and FIG. 6, but in the embodiment of FIG. 7, multiple microfluidic chips 21 (each having at least one flow restrictor channel 22) are arranged in a single chip chamber 36 of the chip holding vessel 30.

In the embodiment shown in FIG. 7, the flow restrictors channels 22 of the microfluidic chips 21 are arranged in the reactor feed lines 5. Alternatively or in addition, flow restrictor channels may be present in the reactor effluent lines 8.

The reactor system of FIG. 7 comprises four reactor assemblies 1. It is however possible that the reactor system according to the invention comprises any other number of reactor assemblies, although generally there will be more than one reactor assembly.

Each reactor assembly 1 comprises a flow-through reactor 2, a reactor feed line 5 and a reactor effluent line 8. The flow-through reactors 2 all have a reactor inlet 3 and a reactor outlet 4. The reactor feed lines 5 all have a first end 6 and a second end 7. The reactor effluent lines 8 all have a first end 9. In each reactor assembly 1, the second end 7 of the reactor feed line 5 is connected to the reactor inlet 3, and the first end 9 of the reactor effluent line 8 is connected to the reactor outlet 4.

The reactor system of FIG. 7 further comprises a fluid source 12, which is adapted to provide a pressurized fluid to the flow-through reactors 2. The reactor system according to the invention is suitable for operation at high fluid pressures, for example about 20 bar or more, about 30 bar or more, about 30 bar to 100 bar or about 30 bar to 300 bar reactor pressure. The reactor system being suitable for operation at these high pressures for example means that the wall thickness of the structural elements that are in contact with pressurized fluid in the system are sufficient to maintain the structural integrity of the system at these high pressures. Further, for examples, seals and/or valves that are used are also suitable for high pressure operations.

The reactor system of FIG. 7 further comprises a flow path controller 15. In the embodiment of FIG. 7, the flow path controller 15 is a manifold that distributes pressurized fluid from the fluid source 12 over the reactor assemblies 1. In this embodiment, the pressurized fluid from the fluid source 12 is provided to all reactor assemblies 1 simultaneously.

The flow path controller 15 comprises a flow path controller inlet 16 and multiple flow path controller outlets 17. Each flow path controller outlet 17 is in fluid communication with the first end 6 of a reactor feed line 5 of an associated reactor assembly 1. The associated reactor assembly 1 receives the pressurized fluid though the flow path controller outlet 17.

The reactor system of FIG. 7 further comprises a flow restrictor channel 22 in each reactor feed line 5. The microfluidic chips 21 that comprise the flow restrictor channels 22 are arranged in a single chip holding vessel 30, which is schematically indicated in FIG. 7. Each microfluidic chip comprises a flow restrictor channel 22, a chip inlet channel and a chip outlet channel. The flow restrictor channel extends in a flow restrictor channel plane. The chip inlet channel and chip outlet channel extend substantially perpendicular to the flow restrictor plane. The diameter of the chip inlet channel is the same or smaller than the length of the chip inlet channel. The diameter of the chip outlet channel is the same or smaller than the length of the chip outlet channel.

FIGS. 2A, 3 and 4 show possible embodiments of the chip holding vessel in more detail. When a chip holding vessel like the one shown in FIG. 2A, 3 or 4 are used, number of fluid supply channels in the chip holding vessel will match the number of chip inlet channels of the microfluidic chip or microfluidic chips present in the chip holding vessel, and the number of fluid discharge channels in the chip holding vessel will match the number of chip outlet channels of the microfluidic chip or microfluidic chips present in the chip holding vessel.

The chip holding vessel has an chip chamber 36 in which the microfluidic chip is arranged. In the embodiment of FIG. 7, the chip chamber 36 of each chip holding vessel 30 is provided with an aperture 39. Optionally, the chip chamber 36 is in fluid communication with the atmosphere via the aperture 39. Alternatively, the reactor system further comprises an ambient pressure waste vessel, which ambient pressure waste vessel is in fluid communication with chip chamber via the aperture 39 and a safety line, like is shown in FIG. 5.

In case leak detection is applied, for example using a flow sensor or pressure sensor as described before, leaks in the microfluidic chips or in one or more of the connections to the microfluidic chips can be detected. Generally, it will not be possible in this embodiment to determine which microfluidic chip 21 or which connection to which microfluidic chip 21 in the chip chamber 36 is leaking.

In the embodiment of FIG. 7, the reactor effluent is discharged from the reactors 2 by the effluent lines 8. For example, the effluent lines are connected to a selection valve 70, which directs the effluent flow of one of the reactors 2 to an analyzer 71 and the other flows to waste 72. Sequentially, one-by-one all effluent flows are directed to the analyzer 71 so all effluent flows can sequentially be analyzed individually.

Figure 8:
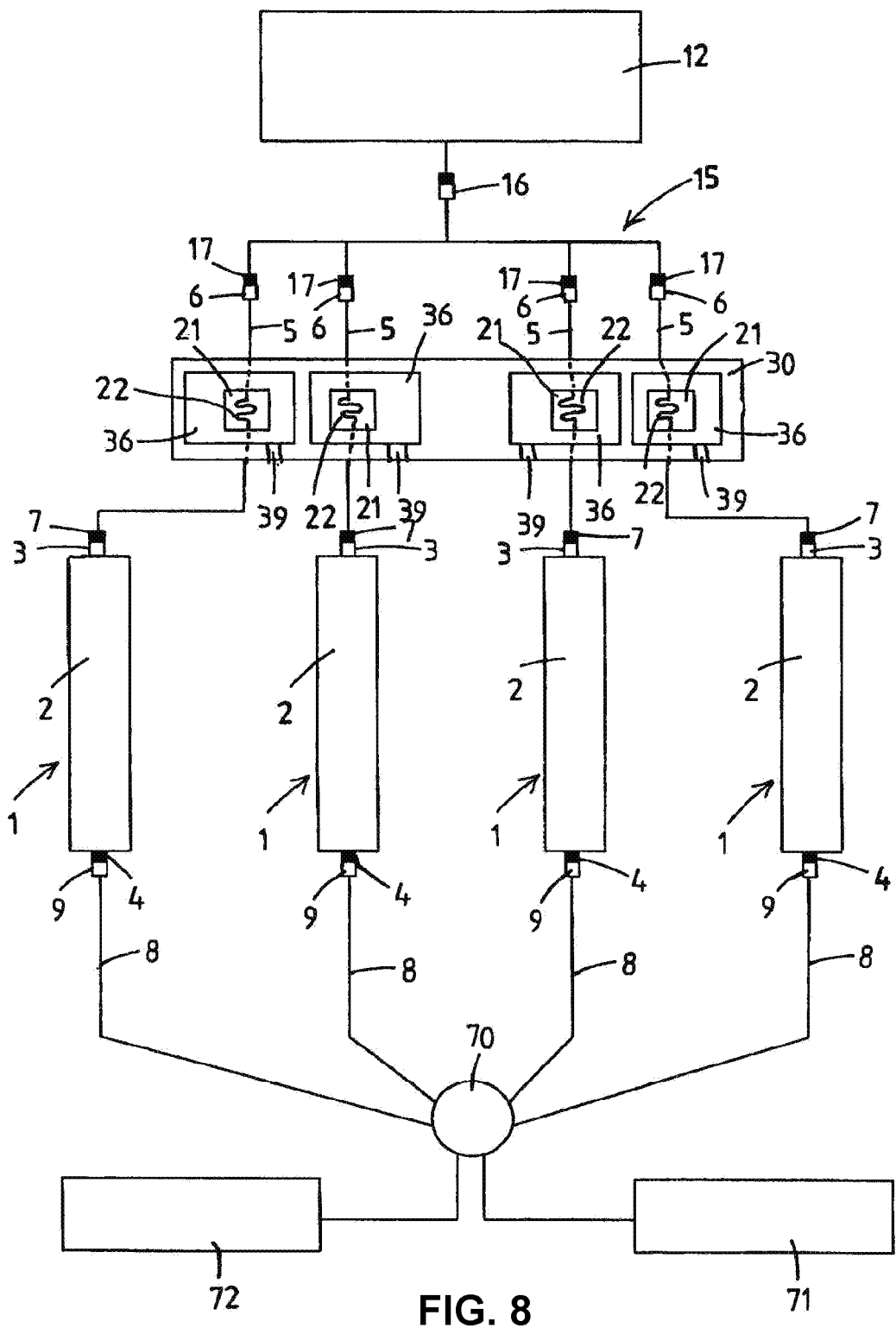
FIG. 8: a further embodiment of an alternative reactor system according to the invention.

FIG. 8 shows a further embodiment of an alternative reactor system according to the invention.

The embodiment of FIG. 8 is similar to the embodiment of FIG. 5, FIG. 6 and FIG. 7, but in the embodiment of FIG. 8, the chip holding vessel 30 comprises multiple chip chambers 36, that each accommodate a microfluidic chip 21. Optionally, at least one of the chip chambers 36 accommodates a plurality of microfluidic chips 21.

In the embodiment shown in FIG. 8, the flow restrictor channels 22 in the microfluidic chips 21 are arranged in the reactor feed lines 5. Alternatively or in addition, flow restrictor channels 22 may be present in the reactor effluent lines 8.

The reactor system of FIG. 8 comprises four reactor assemblies 1. It is however possible that the reactor system according to the invention comprises any other number of reactor assemblies, although generally there will be more than one reactor assembly.

Each reactor assembly 1 comprises a flow-through reactor 2, a reactor feed line 5 and a reactor effluent line 8. The flow-through reactors 2 all have a reactor inlet 3 and a reactor outlet 4. The reactor feed lines 5 all have a first end 6 and a second end 7. The reactor effluent lines 8 all have a first end 9. In each reactor assembly 1, the second end 7 of the reactor feed line 5 is connected to the reactor inlet 3, and the first end 9 of the reactor effluent line 8 is connected to the reactor outlet 4.

The reactor system of FIG. 8 further comprises a fluid source 12, which is adapted to provide a pressurized fluid to the flow-through reactors 2. The reactor system according to the invention is suitable for operation at high fluid pressures, for example about 20 bar or more, about 30 bar or more, about 30 bar to 100 bar or about 30 bar to 300 bar reactor pressure. The reactor system being suitable for operation at these high pressures for example means that the wall thickness of the structural elements that are in contact with pressurized fluid in the system are sufficient to maintain the structural integrity of the system at these high pressures. Further, for examples, seals and/or valves that are used are also suitable for high pressure operations.

The reactor system of FIG. 8 further comprises a flow path controller 15. In the embodiment of FIG. 8, the flow path controller 15 is a manifold that distributes pressurized fluid from the fluid source 12 over the reactor assemblies 1. In this embodiment, the pressurized fluid from the fluid source 12 is provided to all reactor assemblies 1 simultaneously.

The flow path controller 15 comprises a flow path controller inlet 16 and multiple flow path controller outlets 17. Each flow path controller outlet 17 is in fluid communication with the first end 6 of a reactor feed line 5 of an associated reactor assembly 1. The associated reactor assembly 1 receives the pressurized fluid though the flow path controller outlet 17.

The reactor system of FIG. 8 comprises a flow restrictor channel 22 in each reactor feed line 5. The microfluidic chips 21 in which these flow restrictor channels 22 are present are arranged in a chip holding vessel 30, which is schematically indicated in FIG. 8. Each microfluidic chip comprises a flow restrictor channel 22, a chip inlet channel and a chip outlet channel. The flow restrictor channel extends in a flow restrictor channel plane. The chip inlet channel and chip outlet channel extend substantially perpendicular to the flow restrictor plane. The diameter of the chip inlet channel is the same or smaller than the length of the chip inlet channel. The diameter of the chip outlet channel is the same or smaller than the length of the chip outlet channel.

FIGS. 2A, 3 and 4 show possible embodiments of the chip holding vessel in more detail. When a chip holding vessel like the one shown in FIG. 2A, 3 or 4 are used, number of fluid supply channels in the chip holding vessel will match the number of chip inlet channels of the microfluidic chip or microfluidic chips present in the chip holding vessel, and the number of fluid discharge channels in the chip holding vessel will match the number of chip outlet channels of the microfluidic chip or microfluidic chips present in the chip holding vessel.

The chip holding vessel has multiple chip chambers 36 in which the microfluidic chips 21 are arranged. In the embodiment of FIG. 8, each chip chamber 36 of each chip holding vessel 30 is provided with an aperture 39. Optionally, this chip chamber 36 is in fluid communication with the atmosphere via the aperture 39. Alternatively, the reactor system further comprises an ambient pressure waste vessel, which ambient pressure waste vessel is in fluid communication with the associated chip chamber 36 via the aperture 39 and a safety line, like is shown in FIG. 8.

In case leak detection is applied, for example using a flow sensor or pressure sensor as described before, leaks in the microfluidic chips or in one or more of the connections to the microfluidic chips can be detected. In the embodiment of FIG. 8, it is possible to design the leak detection in such a way that it is possible to determine which of the microfluidic chips 21 is leaking. This can for example be achieved by providing a each chip chamber 26 with a pressure sensor, or each aperture 39 with a flow sensor, or by connecting each aperture 39 to an ambient pressure waste vessel (either a common ambient pressure waste vessel or an individual ambient pressure waste vessel) via an individual safety line, which safety lines each are provided with a flow sensor.

In the embodiment of FIG. 8, the reactor effluent is discharged from the reactors 2 by the effluent lines 8. For example, the effluent lines are connected to a selection valve 70, which directs the effluent flow of one of the reactors 2 to an analyzer 71 and the other flows to waste 72. Sequentially, one-by-one all effluent flows are directed to the analyzer 71 so all effluent flows can sequentially be analyzed individually.

Figure 9:
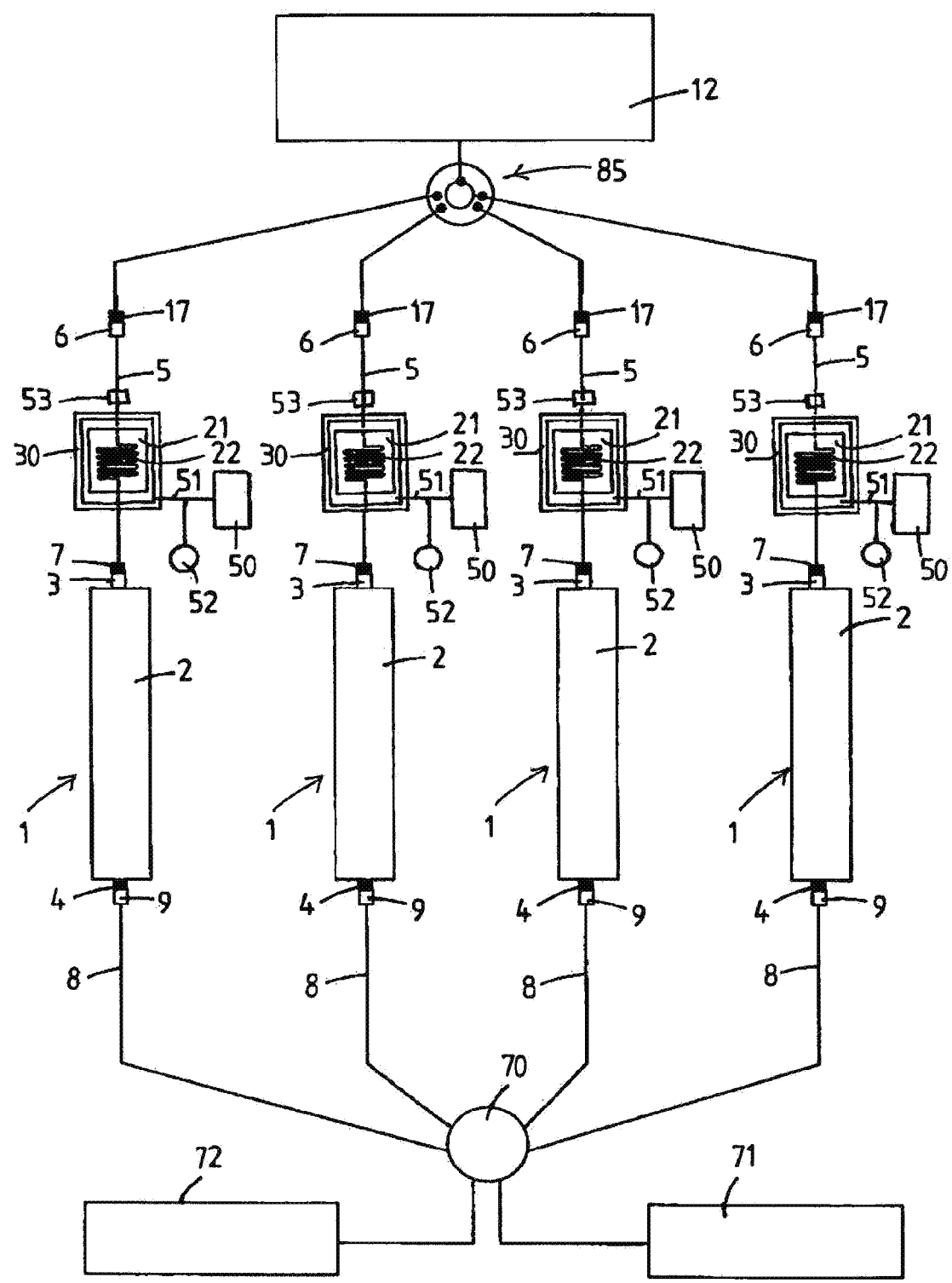
FIG. 9: a further embodiment of an alternative reactor system according to the invention.

FIG. 9 shows a further embodiment of the alternative reactor system according to the invention.

The embodiment of FIG. 9 is very similar to the embodiment of FIG. 5. The only difference is that in the embodiment of FIG. 9, the flow path controller is a selection valve 85, while in the embodiment of FIG. 5, the flow path controller is a manifold.

In the example shown in FIG. 9, the reactor feed lines 5 are sequentially provided with pressurized fluid from the fluid source 12. Optionally, a different fluid, for example an inert fluid, is provided to the reactor feed lines 5 when they do not receive pressurized fluid from the fluid source 12.

Figure 10:
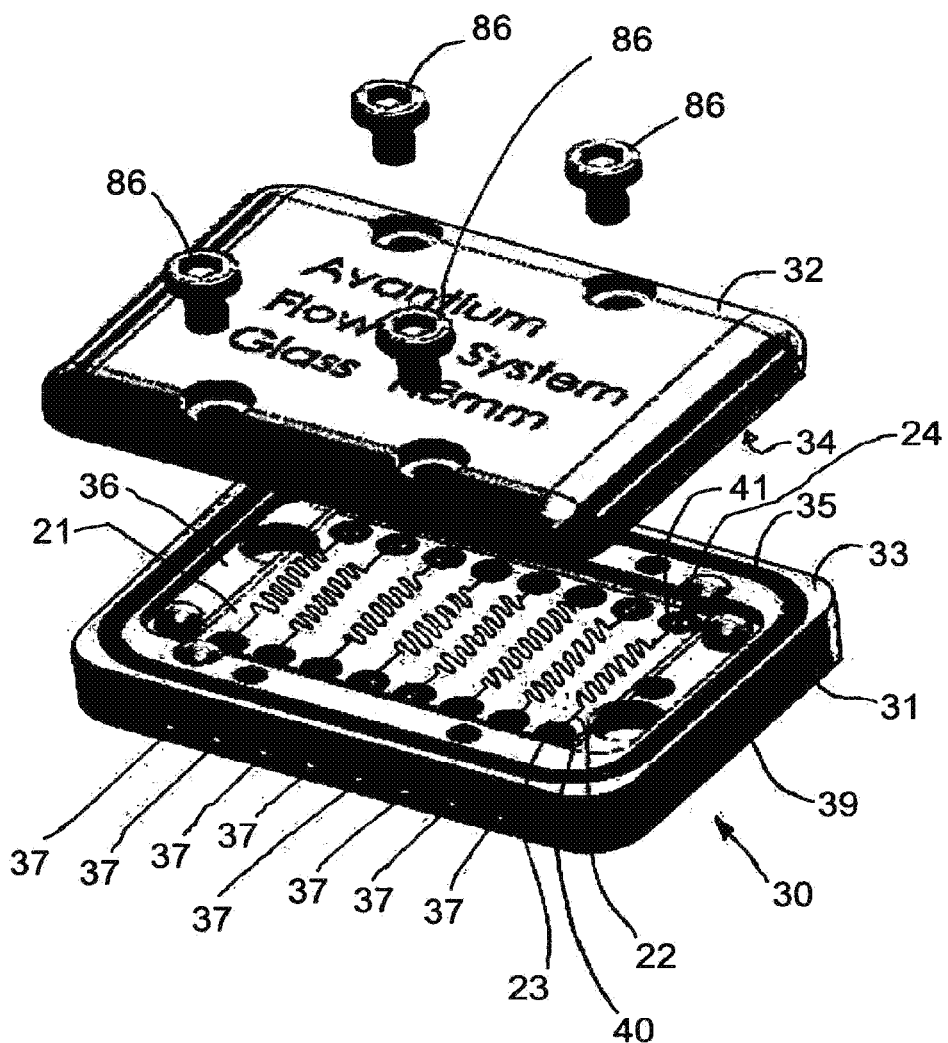
FIG. 10: an embodiment of the chip holding vessel with an chip chamber in which a microfluidic chip is arranged.

FIG. 10 shows an embodiment of the chip holding vessel 30 which an chip chamber 36 in which a microfluidic chip 21 is arranged.

In the embodiment of FIG. 10, the body 47 of the chip holding vessel 30 comprises a base 31 and a cover 32. The base 31 has a first sealing surface 33. The cover 32 has a second sealing surface 34. The first sealing surface 33 and the second sealing surface 34 are in contact with each other when the chip holding vessel 30 is in use. A circumferential seal 35, for example a compressible seal such as an O-ring, has been provided to ensure that in case of a leak in the microfluidic chip or in its connections to the fluid feed channel and fluid discharge channel of the chip holding vessel, all leaked fluid either stays in the chip chamber 36 or leaves the chip chamber 36 via aperture 39. This aids in obtaining a reliable leak detection. Aperture 39 extends between the chip chamber 36 and the atmosphere, but it can alternatively be connected to a waste vessel as for example described in combination with the embodiment of FIG. 5.

In the embodiment shown in FIG. 10, the base 31 and the cover 32 can be connected to each other by screws 86.

In the embodiment of FIG. 10, the microfluidic chip comprises a plurality of flow restrictor channels 22. Each flow restrictor channel 22 is in fluid communication with a chip inlet channel 23 and a chip outlet channel 24. Each chip inlet channel 23 is in fluid communication with a fluid supply channel 37 that extends through the base 31 of the chip holding vessel 30. Alternatively, the fluid supply channels 37 could extend through the cover 32 of the chip holding vessel 30.

Each chip outlet channel 24 is in fluid communication with a fluid discharge channel that extends through the base 31 of the chip holding vessel 30 (not shown in FIG. 10). Alternatively, the fluid discharge channels could extend through the cover 32 of the chip holding vessel 30.

In the embodiment of FIG. 10 optionally the chip holding vessel 30 further comprises a fluid supply channel seal 40 for each fluid supply channel. This fluid supply channel seal 40 is arranged between the fluid supply channel outlet and its associated chip inlet channel 23. The flow restrictor channel inlet seal 40 extends around the fluid supply channel outlet and engages the microfluidic chip. For example, the fluid supply channel seal 40 is a compressible seal such as an O-ring.

Optionally, the chip holding vessel 30 further comprises a fluid discharge channel seal 41 for each fluid discharge channel. This fluid discharge channel seal 41 is arranged between the chip outlet channel 24 and its associated fluid discharge channel inlet. The fluid discharge channel seal 41 extends around the fluid discharge channel inlet and engages the microfluidic chip. For example, the flow restrictor channel outlet seal 41 is a compressible seal such as an O-ring.

Figure 11:
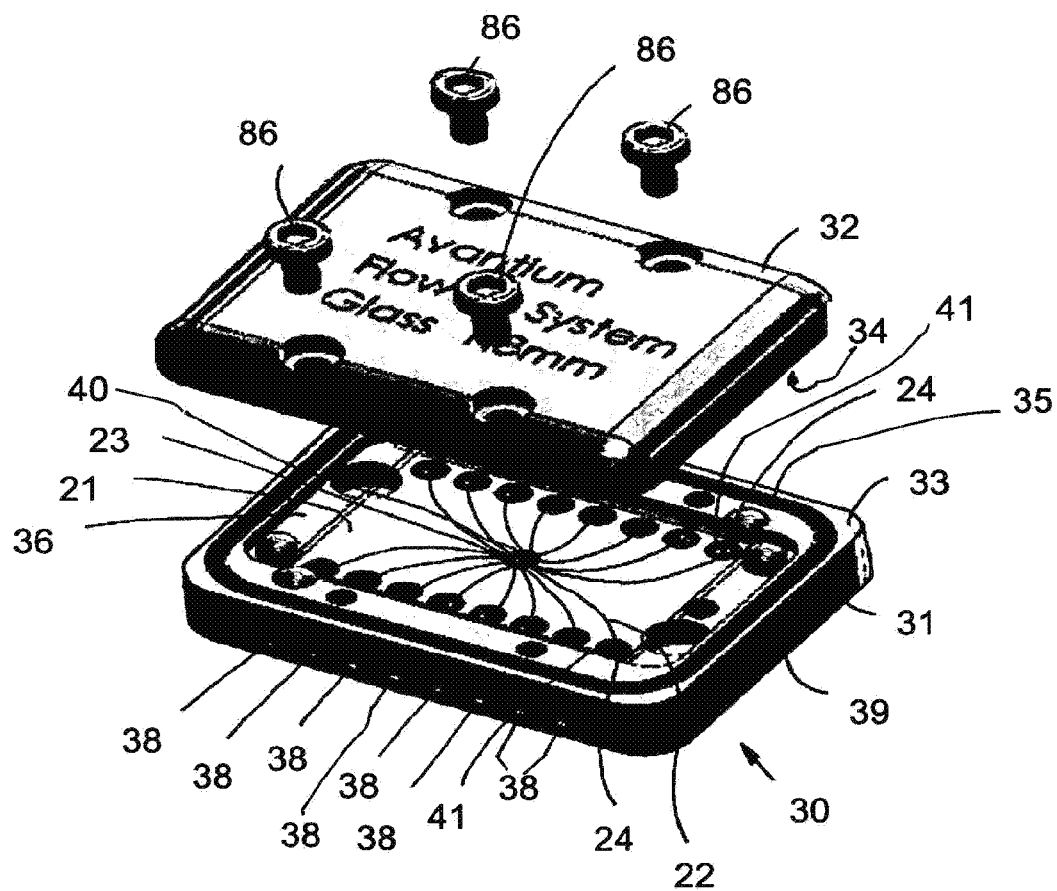
FIG. 11: a further embodiment of the chip holding vessel with an chip chamber in which a microfluidic chip is arranged.

FIG. 11 shows an embodiment of the chip holding vessel 30 which an chip chamber 36 in which a microfluidic chip 21 is arranged.

In the embodiment of FIG. 11, the chip holding vessel 30 comprises a base 31 and a cover 32. The base 31 has a first sealing surface 33. The cover 32 has a second sealing surface 34. The first sealing surface 33 and the second sealing surface 34 are in contact with each other when the chip holding vessel 30 is in use. A circumferential seal 35, for example a compressible seal such as an O-ring, has been provided to ensure that in case of a leak in the microfluidic chip or in its connections to the fluid feed channel and fluid discharge channel of the chip holding vessel, all leaked fluid either stays in the chip chamber 36 or leaves the chip chamber 36 via aperture 39. This aids in obtaining a reliable leak detection. Aperture 39 extends between the chip chamber 36 and the atmosphere, but it can alternatively be connected to a waste vessel as for example described in combination with the embodiment of FIG. 5.

In the embodiment shown in FIG. 11, the base 31 and the cover 32 can be connected to each other by screws 86.

In the embodiment of FIG. 11, the microfluidic chip comprises a plurality of flow restrictor channels 22. Each flow restrictor channel 22 is in fluid communication with an associated chip outlet channel 24, but all flow restrictor channels are in fluid communication with one and the same chip inlet channel 23. The common chip inlet channel 23 is in fluid communication with a fluid supply channel (not shown in the drawing) that extends through the base 31 of the chip holding vessel 30. Alternatively, the fluid supply channel could extend through the cover 32 of the chip holding vessel 30.

Each chip outlet channel 24 is in fluid communication with a fluid discharge channel that extends through the base 31 of the chip holding vessel 30. Alternatively, the fluid discharge channels could extend through the cover 32 of the chip holding vessel 30.

In the embodiment of FIG. 11 optionally the chip holding vessel 30 further comprises a fluid supply channel inlet seal 40. This fluid supply channel seal 40 is arranged between the fluid supply channel outlet and chip inlet channel 23. The fluid supply channel seal 40 extends around the fluid supply channel outlet and engages the microfluidic chip. For example, the fluid supply channel seal 40 is a compressible seal such as an O-ring.

Optionally, the chip holding vessel 30 further comprises a fluid discharge channel seal 41 for each flow restrictor channel 22. This fluid discharge channel seal 41 is arranged between a chip outlet channel 24 and its associated fluid discharge channel inlet. The fluid discharge channel seal 41 extends around the fluid discharge channel inlet and engages the microfluidic chip. For example, the flow restrictor channel outlet seal 41 is a compressible seal such as an O-ring.

The invention claimed is:

1. A reactor system for high throughput applications, which reactor system comprises:
    a plurality of reactor assemblies, each reactor assembly comprising:
    a flow-through reactor, said flow-through reactor comprising a reactor inlet and a reactor outlet, which flow-through reactor is adapted to accommodate a chemical reaction,
    a reactor feed line, which reactor feed line has a first end and a second end, said second end being connected to the reactor inlet of the flow-through reactor, said reactor feed line being adapted to supply a fluid to the flow-through reactor, and
    a reactor effluent line, which reactor effluent line has a first end, which first end is connected to the reactor outlet of the flow-through reactor, said reactor effluent line being adapted to discharge reactor effluent from the flow-through reactor,
    a fluid source, which fluid source is adapted to provide a pressurized fluid to the flow-through reactors, and
    a flow path controller which is adapted to transfer said pressurized fluid from the fluid source to the reactor assemblies, so that said pressurized fluid can be used in the reactions inside the flow-through reactors,
    wherein the flow path controller is arranged downstream of the fluid source and upstream of the reactor assemblies,
    wherein the flow path controller comprises a flow path controller inlet which is in fluid communication with the fluid source and is adapted to receive the pressurized fluid from the fluid source,
    wherein the flow path controller further comprises a plurality of flow path controller outlets, each flow path controller outlet being in fluid communication with the first end of a reactor feed line of an associated reactor assembly and adapted to provide pressurized fluid from the fluid source to the associated reactor assembly,
    wherein the in a reactor feed line and/or reactor effluent line of at least one reactor assembly a flow restrictor channel is present, which flow restrictor channel is arranged in a planar microfluidic chip, which microfluidic chip further comprises a chip inlet channel and a chip outlet channel that are in fluid communication with the flow restrictor channel, the chip inlet channel being upstream of the flow restrictor channel and the chip outlet channel being downstream of the flow restrictor channel, both said chip inlet channel and said chip outlet channel having a length and a diameter, wherein the diameter of the chip inlet channel is the same or less than the length of said chip inlet channel and wherein the diameter of the chip outlet channel is the same or less than the length of said chip outlet channel,
    wherein the microfluidic chip comprises a first body plate and a second body plate which are connected to each other, wherein said first body plate and said second body plate each have a thickness,
    wherein the chip inlet channel is present in the first body plate and extends through the thickness of said first body plate,
    wherein the chip outlet channels are present in the first body plate and/or the second body plate and extend through the thickness of said first body plate and/or said second body plate,
    wherein system at least one microfluidic chip is arranged in a chip holding vessel, which chip holding vessel comprises:
    a vessel body,
    in said vessel body, an chip chamber, said chip chamber accommodating the microfluidic chip therein, which chip chamber is delimited by two generally planar walls and a circumferential chamber wall, which planar walls are arranged on opposite sides of the chip chamber,
    in said vessel body, a fluid supply channel, said fluid supply channel having a fluid supply channel inlet and a fluid supply channel outlet,
    wherein the fluid supply channel is adapted to receive fluid from the reactor feed line or reactor effluent line in which the flow restrictor channel is arranged and to supply said fluid to the chip inlet channel of the microfluidic chip,
    wherein the fluid supply channel inlet is in fluid communication with the reactor feed line or reactor effluent line in which the flow restrictor channel is arranged and the fluid supply channel outlet is in fluid communication with the chip inlet channel, and
    a fluid supply channel seal that extends around the fluid supply channel outlet, and engages the microfluidic chip, and
    in said vessel body, a fluid discharge channel, said fluid discharge channel having a fluid discharge channel inlet and a fluid discharge channel outlet,
    wherein the fluid discharge channel is adapted to receive fluid from the chip outlet channel of the microfluidic chip and to supply said fluid to the reactor feed line or reactor effluent line in which the flow restrictor channel is arranged,
    wherein the fluid discharge channel inlet is in fluid communication with the chip outlet channel and the fluid discharge channel outlet is in fluid communication with the reactor feed line or reactor effluent line in which the flow restrictor channel is arranged, and
    a fluid discharge channel seal, that extends around the fluid discharge channel inlet, wherein said fluid discharge channel seal engages the microfluidic chip, and
    wherein the chip holding vessel comprises a seat for the fluid supply channel seal and a seat for the fluid discharge channel seal, which seats each have a circumferential wall, a bottom and an open top, which circumferential wall supports the seal that is arranged in said seat, wherein the fluid supply channel seal and/or at least one of the fluid discharge channel seals has an annular shape with a central hole, and wherein the chip holding vessel further comprises at least one tubular element, which tubular element extends through the central hole of said seal.

2. The reactor system according to claim 1,
wherein the flow path controller is one of a selection valve, a flow splitter or a manifold.

3. The reactor system according to claim 1,
wherein the diameter of the chip inlet channel and/or at least one of the chip outlet channels varies over the length of said channel, and wherein the average diameter of said channel is the same or less than the length of said channel, said channel optionally having a conical shape.

4. The reactor system according to claim 1,
wherein the diameter of the inlet chip channel and/or at least one of the outlet chip channels is 0.7 mm or less.

5. The reactor system according to claim 1,
wherein the tops of the seats are at a distance from the microfluidic chip, which distance is 200 μm or less, but larger than 0 μm.

6. The reactor system according to claim 1,
wherein the vessel body comprises an aperture, said aperture connecting the chip chamber to an ambient pressure volume, such that—during operation of the reactor system—the pressure in the chip chamber is generally ambient pressure.

7. The reactor system according to claim 1,
wherein the vessel body of the chip holding vessel comprises:

a base, which base comprises one of the planar walls of the chip chamber, and which base further comprises a first sealing surface, a cover, which cover comprises the other of the planar walls of the chip chamber, and which cover further comprises a second sealing surface, the base and the cover together enclosing the chip chamber when the first and second sealing surface are in contact with each other, wherein the chip holding vessel further comprises:

a circumferential seal, which is in contact with the first sealing surface and with the second sealing surface and extends around the circumference of the chip chamber.

8. The reactor system according to claim 6,
wherein the chip chamber is in fluid communication with the atmosphere via the aperture.

9. The reactor system according to claim 8,
which reactor system further comprises a waste vessel, which waste vessel is in fluid communication with chip chamber via the aperture.

10. The reactor system according to claim 6,
wherein the reactor system further comprises a flow detector that is adapted to detect the presence of a fluid flow from the chip chamber through the aperture.

11. The reactor system according to claim 1,
wherein the system further comprises a chip chamber pressure sensor for detecting a pressure change in the pressure in the chip chamber.

12. The reactor system according to claim 1,
wherein a space is present between a part of the outer surface of the microfluidic chip and a planar wall or the circumferential wall of the chip chamber, and wherein a thermal device is arranged in said space.

13. The reactor system according to claim 1, wherein the chip holding vessel encloses the microfluidic chip entirely.

* * * * *